United States Patent
Ledvina et al.

(10) Patent No.: US 10,285,013 B2
(45) Date of Patent: May 7, 2019

(54) ENHANCED AUTOMOTIVE PASSIVE ENTRY

(71) Applicant: Apple Inc., Cupertino, CA (US)

(72) Inventors: Brent M. Ledvina, San Francisco, CA (US); Robert W. Brumley, Menlo Park, CA (US); Robert William Mayor, Half Moon Bay, CA (US); William J. Bencze, Half Moon Bay, CA (US); Alejandro J. Marquez, Sunnyvale, CA (US); Shang-Te Yang, San Jose, CA (US); Xu Chen, San Jose, CA (US); Mohit Narang, San Jose, CA (US); Indranil S. Sen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 15/894,774

(22) Filed: Feb. 12, 2018

(65) Prior Publication Data
US 2018/0234797 A1    Aug. 16, 2018

Related U.S. Application Data

(60) Provisional application No. 62/457,747, filed on Feb. 10, 2017.

(51) Int. Cl.
*H04W 4/02*    (2018.01)
*B60R 25/24*    (2013.01)
*G07C 9/00*    (2006.01)

(52) U.S. Cl.
CPC ............ *H04W 4/023* (2013.01); *B60R 25/24* (2013.01); *G07C 9/00119* (2013.01); *B60R 2325/205* (2013.01)

(58) Field of Classification Search
CPC .................................. B60R 25/24; G01D 5/20
(Continued)

(56) References Cited

U.S. PATENT DOCUMENTS 8,130,076 B2    3/2012    Nakajima et al.
9,152,609 B2    10/2015    Schwartz et al.
(Continued)

FOREIGN PATENT DOCUMENTS

EP    2 800 068 A2    5/2014
EP    2 942 760 A1    11/2015
(Continued)

OTHER PUBLICATIONS

Xu, Beilei et al., "A Machine Learning Approach to Vehicle Occupancy." The 17th Int. IEEE Conference on Intelligent Transportation Systems, Qingdao, China. Oct. 8-11, 2014. 6 pages.
(Continued)

*Primary Examiner* — Joshua L Schwartz
(74) *Attorney, Agent, or Firm* — Kilpatrick Townsend & Stockton LLP

(57) ABSTRACT

Methods and devices are provided for allowing a mobile device (e.g., a key fob or a consumer electronic device, such as a mobile phone, watch, or other wearable device) to interact with a vehicle such that a location of the mobile device can be determined by the vehicle, thereby enabling certain functionality of the vehicle. A device may include both RF antenna(s) and magnetic antenna(s) for determining a location of a mobile device relative to the vehicle. Such a hybrid approach can provide various advantages. Existing magnetic coils on a mobile device (e.g., for charging or communication) may be re-used for distance measurements that are supplemented by the RF measurements. Any device antenna may provide measurements to a machine learning model that determines a region in which the mobile device resides, based on training measurements in the regions.

21 Claims, 13 Drawing Sheets

(58) Field of Classification Search
USPC .......................................... 455/456.1–456.6
See application file for complete search history.

(56) References Cited

U.S. PATENT DOCUMENTS

| | | |
|---|---|---|
| 9,859,998 B2 | 1/2018 | Li et al. |
| 2001/0005170 A1 | 6/2001 | Heide et al. |
| 2002/0097145 A1 | 7/2002 | Tumey et al. |
| 2008/0142713 A1 | 6/2008 | Breed et al. |
| 2010/0305779 A1* | 12/2010 | Hassan .................. G01C 17/38 701/2 |
| 2016/0328661 A1* | 11/2016 | Reese .................. G06N 99/005 |
| 2017/0327083 A1* | 11/2017 | Verkin ..................... G01D 5/20 |
| 2018/0083349 A1* | 3/2018 | Sieber .................. H04B 5/0037 |

FOREIGN PATENT DOCUMENTS

| | | |
|---|---|---|
| FR | 2962706 A1 | 1/2012 |
| JP | 2016020580 A | 2/2016 |

OTHER PUBLICATIONS

Pavlidis, Ioannis et al., "A Vehicle Occupant Counting System Based on Near-Infrared Phenomenology and Fuzzy Neural Classification." IEEE Transactions on Intelligent Transportation Systems, vol. 1, No. 2. Jun. 2000. 14 pages.

Kamouaa, "How to Define the LF Driver's Key Parameters in Automotive PEPS Systems." Copyrigh 2012 Atmel Corporation. 10 pages.

"International Search Report and Written Opinion," dated May 4, 2018 in International Application No. PCT/US2018/017877. 116 pages. (copy not provided).

* cited by examiner

ENHANCED AUTOMOTIVE PASSIVE ENTRY

CROSS-REFERENCES TO RELATED APPLICATIONS

The present application claims priority from and is a nonprovisional application of U.S. Provisional Application No. 62/457,747, entitled "Enhanced Automotive Passive Entry" filed Feb. 10, 2017, the entire contents of which are herein incorporated by reference for all purposes.

BACKGROUND

Modern cars allow entry using a key fob, and some cars allow starting by a button when the key fob is inside the car. Such operation is called passive entry and passive start, which use a position of the key fob to unlock the car, allow starting the car, and provide other functionality. The location of the key fob is determined using magnetic signals emitted from magnetic antennas in the car. The magnetic signals are measured by the key fob and sent to the car for determining a location of the key fob.

The key fob can be bulky and be an additional item that a user must carry. Further, the magnetic fields are short range, and current techniques are susceptible to hackers, which can allow a thief to access the car and potentially steal it.

Therefore, it is desirable to provide new methods and devices that overcome any one of these problems.

BRIEF SUMMARY

Some embodiments can provide methods and devices for allowing a mobile device (e.g., a key fob or a consumer electronic device, such as a mobile phone, watch, or other wearable device) to interact with a vehicle such that a location of the mobile device can be determined by the vehicle, thereby enabling certain functionality of the vehicle.

According to one embodiment, the mobile device and the vehicle can include radiofrequency (RF) antenna(s) and magnetic antenna(s). The mobile device can measure signal properties of the RF signals and the magnetic signals from the vehicle that relate to a distance of the device's antenna from a vehicle antenna. Examples of signal properties include a received signal strength indicator (RSSI) and a time-of-flight value (e.g., a round trip time, RTT). In some implementations, the magnetic antenna(s) can measure an RSSI of the magnetic signals, and the RF antenna(s) can measure a time-of-flight value. The various types of antennas can be used in combination or separately. For example, the RF antenna(s) can be used to determine changes in location of the mobile device far from the vehicle (e.g., to determine a user is approaching the vehicle), while the magnetic antenna(s) can be used to determine a location of the mobile device when the mobile device is near or inside the vehicle. Either the mobile device or the vehicle can determine the location. The location can be provided to a control unit of the vehicle, thereby enabling the control unit to perform a prescribed operation of the vehicle, such as unlocking one or more doors or allowing use of a start button.

In some embodiments, magnetic charging coils can be reused as a magnetic antenna. In other embodiments, a near-field communications (NFC) antenna can be reused as a magnetic antenna for use in determining a location of the device. Such a reuse of one or both can avoid a need for dedicated magnetic antennas and providing for a smaller and less expensive mobile device. In other implementations, a vehicle can have three-dimensional magnetic antennas, thereby allowing the mobile device to have only one magnetic antenna.

According to another embodiment, signal values measured from one or more antennas (e.g., RF or magnetic) can be used with a machine learning model to classify a location of the mobile device as being within one of a set of regions. The set of regions can include a first subset of one or more regions outside the vehicle and a second subset of one or more regions outside the vehicle. The machine learning model can be trained using various sets of signal values measured at locations across the plurality of regions. The particular region can be provided to a control unit of the vehicle, thereby enabling the control unit to perform a prescribed operation of the vehicle.

A better understanding of the nature and advantages of embodiments of the present invention may be gained with reference to the following detailed description and the accompanying drawings.

DETAILED DESCRIPTION

Some embodiments can enable a consumer electronic device (e.g., a mobile phone, watch, or other wearable device) to unlock and/or start an automobile without the need for a dedicated automotive key fob. Consumer electronic devices do not have the available physical space for a typical key fob, including three low-frequency (LF) magnetic antennas. Embodiments can implement a hybrid location solution that uses one or more RF antennas and one or more magnetic antennas. Such an implementation can still provide 10-cm location accuracy, thereby enabling a passive entry/passive start solution in automobiles.

Some embodiment can fewer than three magnetic antennas and/or smaller magnetic antennas, in order to provide the desired functionality and accuracy. In one embodiment, magnetic charging coils can be reused as a magnetic antenna. In another embodiment, a near-field communications (NFC) antenna can be reused as a magnetic antenna for use in determining a location of the device. Such a reuse of one or both can avoid a need for dedicated magnetic antennas and providing for a smaller and less expensive mobile device.

Some embodiments can enable a mobile device (e.g., a key fob or mobile phone) to unlock and start an automobile using a machine learning model that determines whether a mobile device is in one of a set of regions (e.g., a set of predetermined regions) in and around a vehicle. The machine learning model can enable passive entry/passive start in the presence of signal attenuation, delay, and multipath, thereby enabling entry in automobiles without the need for LF antennas and LF signals. In some implementations, LF antennas may be used to improve accuracy.

I. Passive Entry Using LF

Automotive key fobs with passive entry/passive start capabilities use low-frequency (LF) magnetic signals to determine location of the key fob. This technology can enable 10-cm location accuracy. This accuracy is needed for feature reliability and can be a requirement of insurance companies. LF-based key fobs have relatively large antennas and are susceptible to man-in-the-middle attacks.

A. Operations

Figure 1:
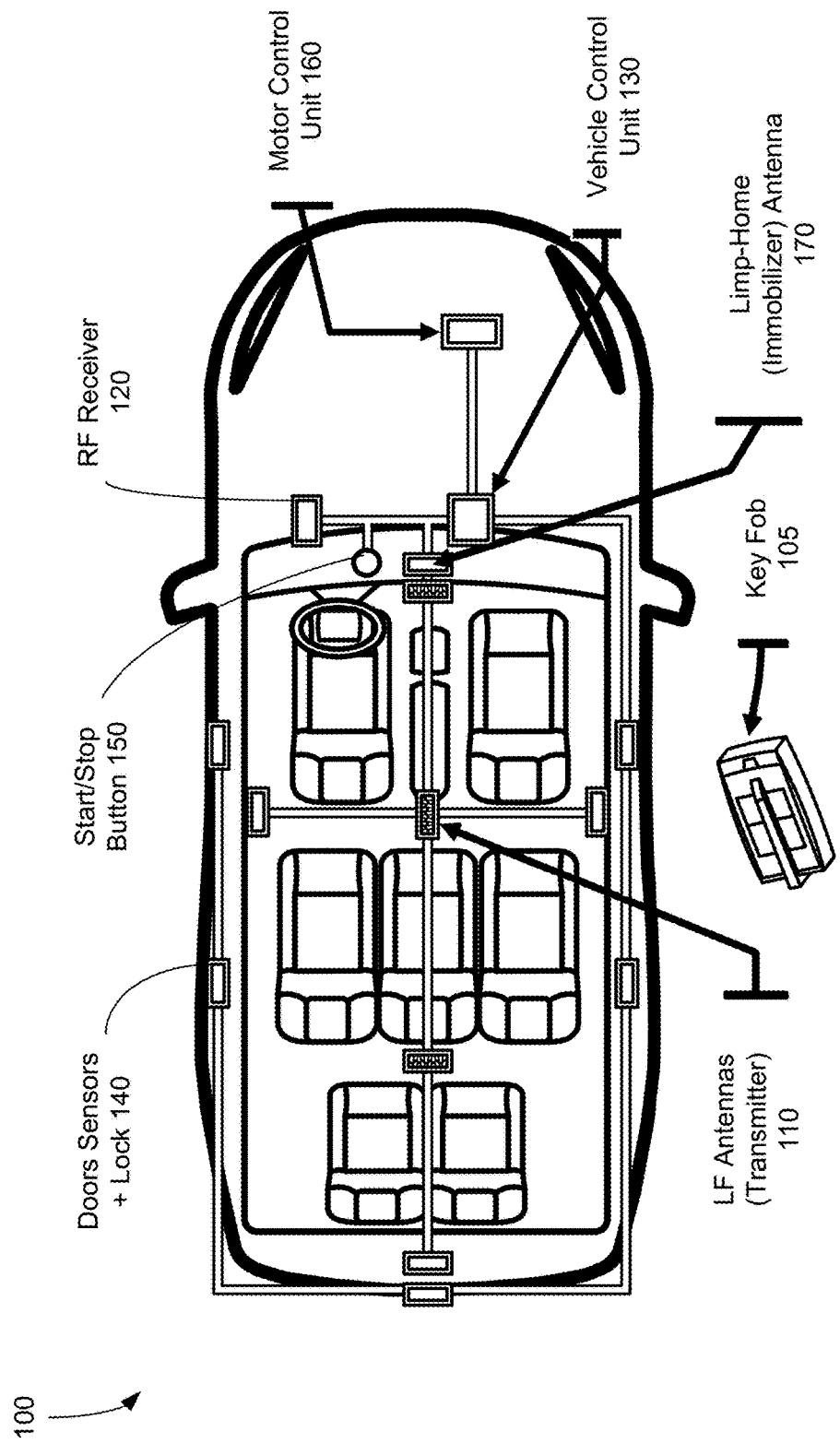
FIG. 1 shows a vehicle with an LF location system.

FIG. 1 shows a vehicle 100 with an LF location system. In automobiles, an LF magnetic system is used to locate a key fob 105. Per FIG. 1, modern automobiles typically have multiple transmitting LF magnetic antennas 110 (e.g., 4-8). These antennas are 1-dimensional, in that the vector magnetic field they generate is primarily in one direction. They are placed throughout a car in order to provide good geometrical accuracy when localizing the key fob. The 1-D magnetic field generated by the automotive LF antennas is compensated for by the 3-D LF antenna in the key fob, which can measure at the vector magnetic field strength.

RF receiver 120 can receive measurement data from key fob 105 and communicate the measurements to a vehicle control unit 130, which can control door sensors 140 a start/stop button 150. As shown, vehicle control unit 130 is connected to motor control unit 160, which operates the motive function of the automobile. As mentioned above, key fob 105 is typically bulky and an extra device that needs to be carried.

A limp-home antenna 170 can that key fob 105 has been removed, thereby initiating a limp-home mode for vehicle 100. A limp-home mode can partially disable the vehicle, while maintaining the ability to drive. One example is when the key fob is present inside of a vehicle to start the vehicle, and then the key fob is removed from the interior of the vehicle (e.g., lost or thrown out the window). In this case, the vehicle may indicate the key fob is missing but may continue to allow the engine to run and the vehicle to be driven. In this example, the vehicle cannot be restarted without bringing the key fob back into the interior of the vehicle.

B. LF Device

Existing automotive passive entry/passive start systems work by using low-frequency (LF) magnetic signals (e.g., at 100s of kHz, such as up to 500, 600, 700, 800, or 900 kHz) to localize a key fob. The location provides the necessary input to determine what action the automobile should take. Some examples of decisions based on key fob location are whether or not to: unlock doors, start the car, or prevent rear hatch from closing with key inside.

Existing LF technology requires an antenna with a relatively large volume, thereby requiring a large key fob or making it challenging to integrate into a consumer mobile device, e.g., smartphone or watch. For example, a consumer mobile/electronic device typically has a display screen (e.g., a touchscreen) and ideally has a thin, flat shape, which is difficult to maintain if a standard 3D LF antenna was added. Another challenge is that there are man-in-the-middle attacks on the LF signal due to its slow modulation rate. These attacks, if successful, can allow someone to steal an automobile.

Figure 2:
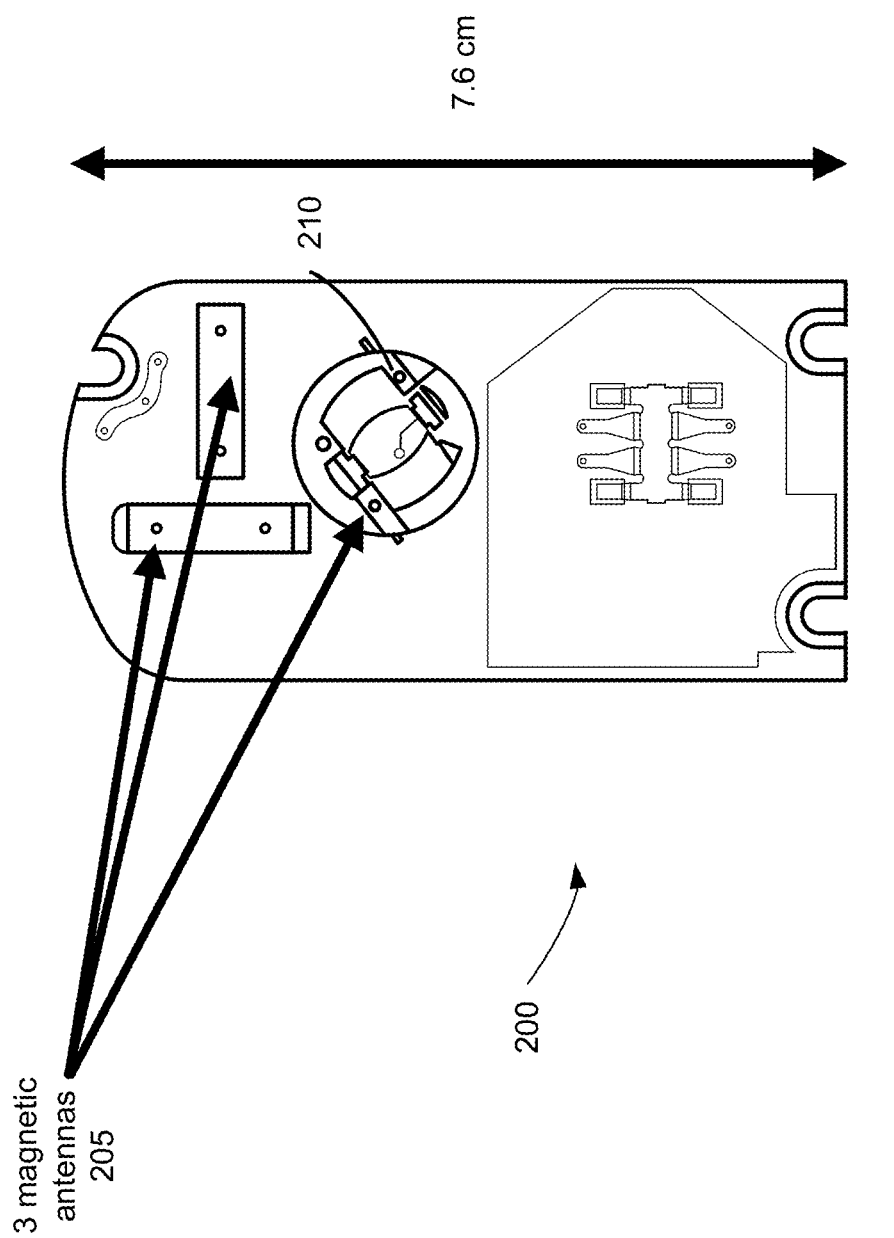
FIG. 2 shows the internals of a key fob.

FIG. 2 shows the internals of a key fob 200. FIG. 2 illustrates the relatively large size of the three LF antennas 205 (providing 3 orthogonal measurements of the vector field) required for 10-cm localization accuracy. As shown, the antenna 210 has a diameter of about 2 cm. 10-cm localization accuracy is required to meet insurance requirements and needed for reliable passive entry/passive start. The 3D-antenna can ensure that a sufficiently strong signal is measured by the key fob, regardless of its orientation. For example, the vehicle magnetic antennas are typically a solenoid coil with a magnet inside the solenoid, which provides a mostly linear magnetic field. If the device's coil is not oriented to have an axis in at least some alignment (e.g., parallel with) with the linear magnetic field from the vehicle antenna, the magnetic flux measured in the device coils can diminish. Having three coils that are orthogonal with each other can ensure that at least one of the coils is receiving a strong signal. Also, when the signal strengths from the three coils are combined, the total is generally invariant with respect to orientation.

C. Location Determination

Figure 3:
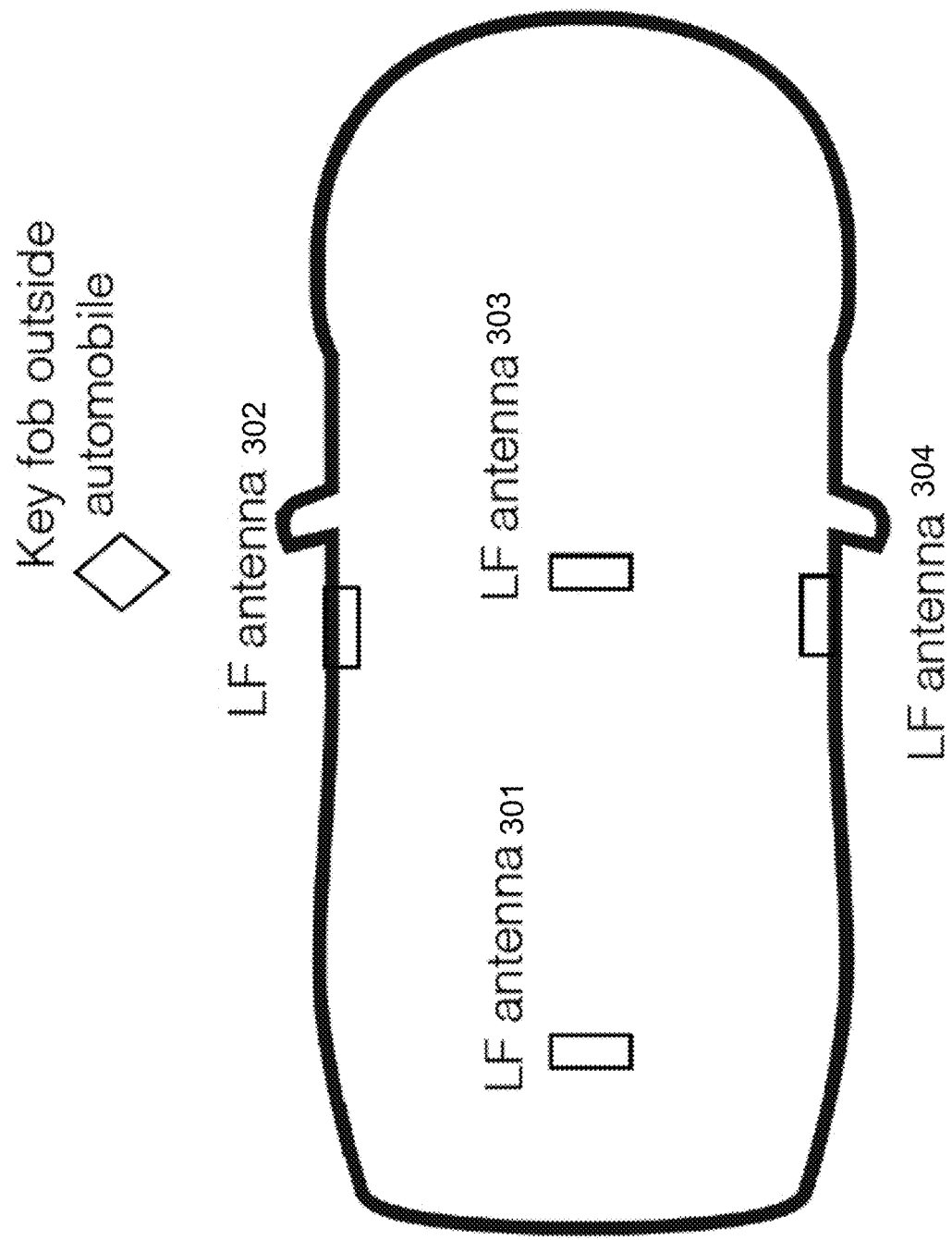
FIG. 3 shows the high-level system design for an LF passive entry/passive start automotive system.

FIG. 3 shows the high-level system design for an LF passive entry/passive start automotive system. The user physically interacts with the automobile, e.g., by touching the driver-side door handle or pressing the start button of the automobile. Typically, such a physical interaction with the automobile is needed for the automobile to initial a key fob localization using the LF system. Some embodiments described later can begin localization based on a communication trigger between a device and the automobile.

Key fob distance measurements can be made by sequentially or simultaneously measuring received signal strength from each automotive LF antenna (antennas 301-304 in FIG. 3). A distance measurement is made by having the key fob measure the received LF field strength from each antenna and then converting the strength to a distance (later embodiments described how signal strength can be converted directly to a region determined, e.g., inside or outside). Specifically, the voltage across the LF coil is converted into a distance measurement. The power of the magnetic field strength falls off by $1/r^3$ in the near field, thereby providing excellent sensitivity to changes in distance. The measured magnetic field strength can be correctly associated with each antenna, thereby allowing triangulation with known positions of LF antennas 301-304. In some embodiments described later, the distance is not computed, and the signal strength values can be used directly to determine the key fob location.

The measured LF field strengths (or distances) can then transmitted back to the automobile in order for the automobile to compute the location of the key fob. Alternatively, the key fob could compute the location instead or in addition to the automobile determining the location. A secondary channel (e.g., a UHF channel) can be used to transfer this information.

In addition to these communications, other communications can cryptographically authenticate the key fob to the automobile and automobile to the key fob, e.g., using Bluetooth®. Such a security system can have some weakness, primarily from man-in-the-middle attacks on the LF sub-system. For example, an attacker can amplify a signal from the key fob, which can simulate as if the key fob was near or inside the vehicle. As another example, an attacker can sniff out and save rolling authentication codes that get re-used. The use of a consumer electronic device can enable more advanced authentication techniques.

II. RF Ranging

Some embodiments can provide an improved user experience of a passive entry/passive start system by removing the need for a key fob entirely and allow the user's mobile device (e.g., smart phone) to carry out the existing passive entry/passive start features. As part of enabling a mobile device (e.g., a mobile phone) to perform such passive functionality, radiofrequency (RF) signals can be used, as opposed to the low frequency (LF) magnetic signals.

Accordingly, a solution to above problems is to replace (or supplement) the LF subsystem in the automobile and key fob with a high-precision RF ranging system integrated into the automobile and mobile device. An RF ranging system, such as ultra-wideband (UWB), has cm-level ranging accuracy, a small antenna suitable for integration into a mobile device, functions substantially far from the automotive (~10 m away), and doesn't have the same security vulnerabilities as an LF system.

Another improvement to user experience can be to detect the user's intent when approaching or leaving the automobile, e.g., the user approaching the automobile likely has the intent to unlock the vehicle if the vehicle is currently locked. Additionally, as the user approaches the automobile, the automobile can turn on the interior lights, enable the heating system, and unlock the doors or trunk, without requiring physical interaction and doing so securely. Such longer range intent can be achieved as the power of RF signals decays as $1/r^2$. Another improvement can be to reduce the susceptibility of an LF magnetic man-in-the-middle attack.

A. Example RF System

Figure 4:
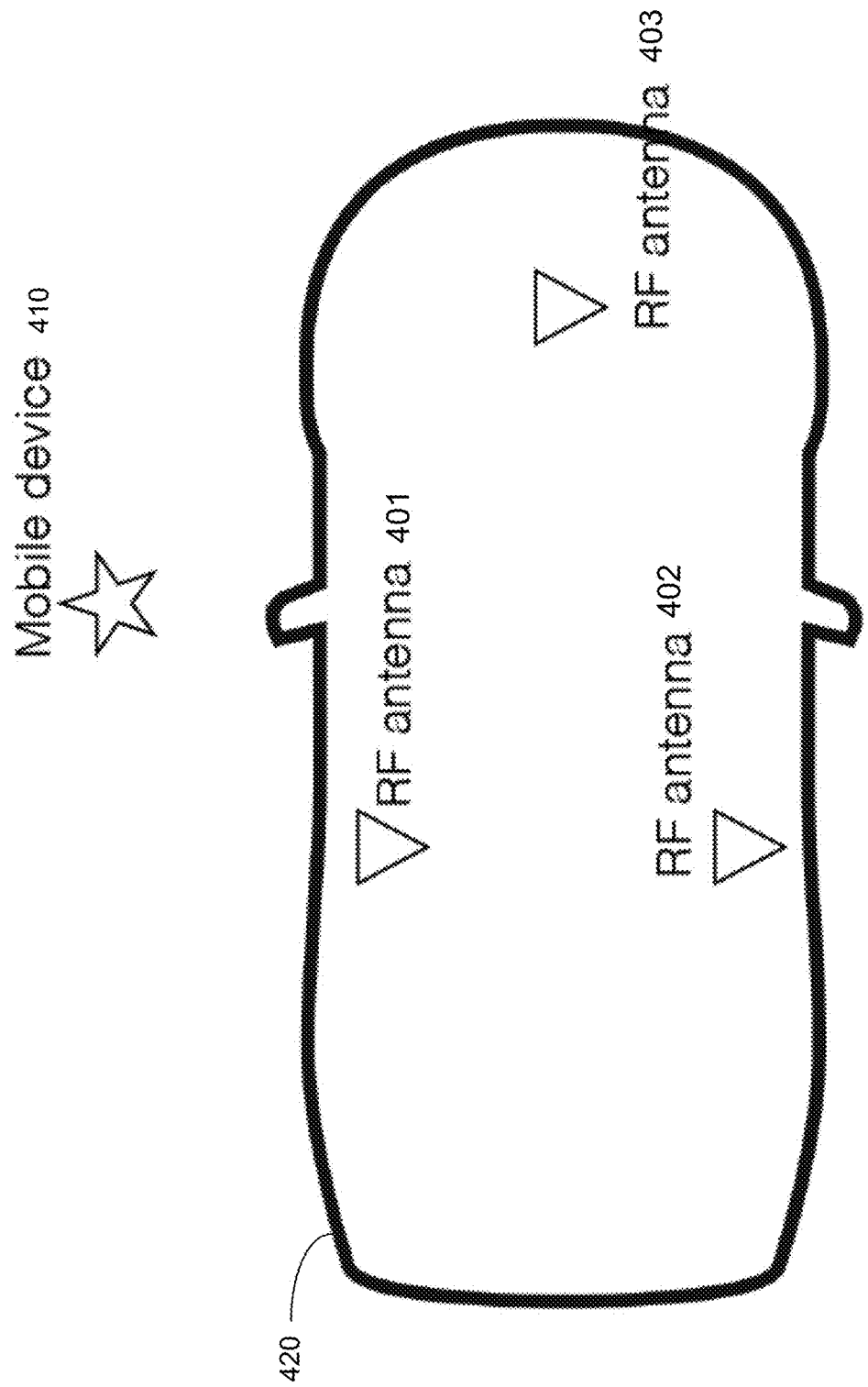
FIG. 4 shows an alternative high-level system design for an RF ranging passive entry/passive start automotive system according to embodiments of the present invention.

FIG. 4 shows an alternative high-level system design for an RF ranging passive entry/passive start automotive system according to embodiments of the present invention. A vehicle 420 can include multiple RF antennas 401-403 (3 as shown) that send signals to a mobile device 410. The mobile device 410 can determine a distance from the RF antennas 401-403 by use of a signal property, such as RSSI or time-of-flight information (e.g., RTT or just time for one-way transmission). The measured signal values can be used by the mobile device 410 or the vehicle 420 (e.g., after receiving the measured signal values from the mobile device 410) to determine the relative location of the mobile device 410 with respect to the vehicle 420.

Unlike a magnetic LF system, a concern with any RF ranging system is that the automotive body, nearby obstructions (cars, buildings, ground), and the human body may cause signal multipath and signal attenuation. Multipath and attenuation can degrade the position accuracy of the user's device such that it may not perform at the required levels for the automotive industry (e.g., 10-cm accuracy for inside/outside detection). For example, the car should be enabled only when the user is in the driver's seat. Multipath can be particularly problematic when the user is in or near the automobile. To address such issues, some embodiments can use an LF system in combination with the RF system. In addition or alternatively, embodiments can use a machine learning model to determine whether the mobile device is in certain regions in or around the vehicle. Further, multiple RF antenna may be used in case one of the antennas is obscured, e.g., by a user's hand.

B. Example RF Ranging Sequence

The mobile device and the vehicle can be paired using a first wireless protocol (e.g., Bluetooth®). The mobile device and the vehicle may then communicate with each other, e.g., at any time later, including hours, days, weeks, etc. later. After pairing, the vehicle and/or the mobile device can be authenticated using the first wireless protocol.

The pairing can occur as a result of the mobile device transmitting an advertisement signal (e.g., using Bluetooth® low energy (BTLE)), and the vehicle detecting the advertisement signal during a scan. Such advertisement and detection can comprise a triggering event to begin localization, which can occur farther away than a physical triggering, such as lifting a door handle. Another example of a triggering event is establishing a BTLE connection, e.g., authenticating the vehicle and/or generating keys for ranging. Such keys for authentication can be stored and managed by a secure element, e.g., in an application processor. The mobile device and the vehicle can exchange ranging capabilities using the first wireless protocol. Ranging can be initiated using the first wireless protocol, and then carried out using a second protocol, e.g., ultra-wideband (UWB). Further details can be found in U.S. Provisional No. 62/565,637, which is incorporated by reference in its entirety. In other embodiments, a same protocol can be used for authentication and ranging.

After the initiation signals using the first wireless protocol, the vehicle can begin scanning for ranging signals at a specified time using one or more vehicle antenna units corresponding to the second wireless protocol. The one or more vehicle antenna units can receive one or more ranging request messages and send one or more ranging response messages. A control unit in each of the one or more vehicle antenna units or shared among them can perform various levels of processing of such ranging messages, e.g., to determine time stamps. The mobile device can receive the ranging response messages and determine time stamps for the transmission of the one or more ranging request messages and time stamps for the one or more ranging response messages. The mobile device can send these time stamps to the vehicle for determining a distance between the mobile device and the vehicle. In other implementations, the mobile device can determine the distance based on transmission and reception time of ranging signals. The ranging can continue until a stop ranging request is processed. In some embodiments, other location information besides distance can be used, e.g., which region the mobile device is in, as described in section IV.

As part of the ranging, the mobile device or vehicle can send an initial ranging message, which can include a series of pulses. These pulses can be narrower than the pulses used in a first wireless protocol used for authentication. For example, the mobile device can broadcast the initial ranging message so that each of the RF antennas of the vehicle can receive it. The mobile device can track the exact time (e.g., to 10-100 picosecond accuracy) at which the initial ranging message was sent. Each of the vehicle RF antennas can send a ranging response message, which can include an identifier that identifies which vehicle RF antenna sent a particular response message. The mobile device can track the exact times for receiving the ranging response messages.

In some embodiments, the mobile device can send the received times to the vehicle, which may use its own received times of receiving the initial ranging message at each of the vehicle RF antennas and the times of sending each of the three ranging response messages for the example of FIG. 4 to determine the distance (or other location information) between the mobile device and the vehicle. Differences in the times of sending and receiving each of the messages can be used to determine the distance, e.g., when the clocks of the two devices are synchronized. As another example, a time delay of receiving the initial ranging response message and sending a ranging response message can be subtracted from the sending and receiving times at the mobile device to obtain the round trip time, which can be translated to a distance based on the speed of the electromagnetic signal. The known positions of the different RF antennas in the vehicle can be used to triangulate the position of the mobile device with respect to vehicle.

In other embodiments, the mobile device can determine the distance (or other location information) from the vehicle. For example, if the ranging information exchanged by the vehicle includes (1) relative positions of the RF antennas of the vehicle and (2) an expected delay between receiving a ranging request message and transmitting a ranging response message, the mobile device can determine the distance using the received times of it sending and receiving ranging messages.

Figure 5:
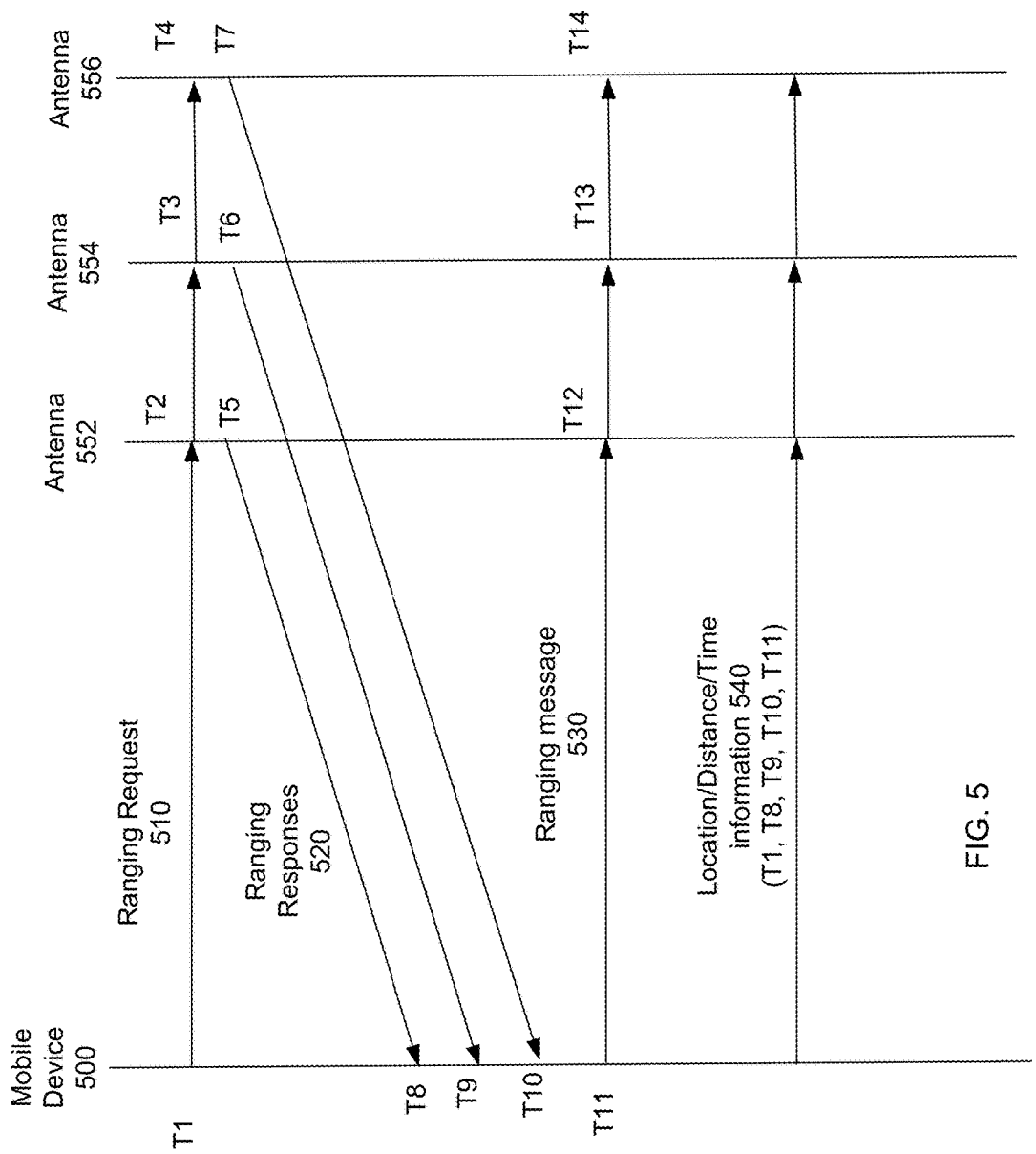
FIG. 5 shows a sequence diagram of a ranging operation involving a mobile device and three antennas of a vehicle according to embodiments of the present invention.

FIG. 5 shows a sequence diagram of a ranging operation involving a mobile device 500 and three antennas 552-556 of a vehicle according to embodiments of the present invention. In this example of FIG. 5, mobile device 500 broadcasts a single packet that is received by antennas 552-556 (e.g., each of a different node). In another implementation, mobile device 500 can send a packet to each node, and have each node respond to that distinct packet. The vehicle can listen at a specified antenna so that both devices know which vehicle antenna is involved, or a packet can indicate which antenna a message is for. For example, a first antenna can respond to a received packet; and once the response is received, another packet can be sent to a different antenna. But, this alternative procedure takes more time and power.

FIG. 5 shows a ranging request 510 sent at T1 and being received at antennas 552-556 at times T2, T3, and T4, respectively. Thus, the antennas (e.g., UWB antennas) listen at substantially the same time and respond independently. Antennas 552-556 provide ranging responses 520, which are sent at times T5, T6, and T7, respectively. Mobile device 500 receives the ranging responses at times T8, T9, and T10, respectively. An optional ranging message 530 can be sent (shown at T11) that is received by antennas 552-556 at times T12, T13, and T14, respectively. Information 540 (e.g., location, distance, or time) can be sent after a set of ranging messages and may only need to be received by one antenna, which can relay the information to a control unit. In the example shown, time stamps tracked by mobile device 500 are sent to at least one of antennas 552-556, so that the vehicle can determine the distance from the vehicle, e.g., based on the locations of the antennas in the vehicle. In other examples, mobile device 500 can determine a distance and send the distance to the vehicle. Other location information can be determined besides distance, e.g., which region the mobile device resides, as described in section IV.

In some embodiments, to determine which ranging response is from which antenna, the vehicle can inform the mobile device of the order of response messages that are to be sent, e.g., during the ranging setup handshake. In other embodiments, the ranging responses can include identifiers, which indicate which antenna sent the message. These identifiers can be negotiated in the ranging setup handshake.

Use of ranging message 530 can allow improved accuracy. The antennas can be on a synchronized clock with each other, but the response times (e.g., delay between T2 and T5) can have different delays, e.g., T5–T2 and T6–T3 can be different. Ranging message 530 can provide resilience to the turnaround times being different for each of the antenna nodes. Such differences in turnaround times can result in ranging errors of a meter or two meters. By adding ranging message 530, embodiments can reduce an error due to the different turnaround times. Such an alternate formulation of the distance equation can provide a function of the timestamps that substantially minimizes the effects of the residual clock drift rates and clock offsets accumulated during the potentially different turnaround times.

Messages 510-530 can include very little data in the payload, e.g., by including fewer pulses than might otherwise be used. Using fewer pulses can be advantageous. The environment of a vehicle and a mobile device (potentially in a pocket) can make measurements difficult. As another example, a vehicle antenna might face a different direction than the direction from which the mobile device is approaching. Thus, it is desirable to use high lower for each pulse, but there are government restrictions (as well as battery concerns) on how much power can be used within a specified time window (e.g., averaged over 1 millisecond). The packet frames in these messages can be on the order of 150 to 180 microseconds long. The packet frame in a message including information 540 can be longer, e.g., 200 or 250 microseconds long.

III. Combined RF and LF

One problem of using LF in a consumer electronic device is a size of the magnetic coils. Specifically, the use of three orthogonal coils to ensure an accurate measurement, i.e., that sufficient magnetic flux is measured regardless of the orientation of the device. As mentioned above, an RF-only ranging system may suffer attenuation problems, thereby inhibiting the desired accuracy (e.g., within 10 cm).

Using both RF and LF antennas can reduce such problems. For example, only one LF antenna may be used, as the RF antenna(s) can supplement the measurements to ensure a sufficiently strong signal from a sufficient number of antennas. For instance, the device may not measure a sufficiently strong signal from one LF antenna due to a current orientation of the device, and thus that LF antenna may not provide any usable location information. But, one or more RF antennas (which may be near the currently unusable LF antenna) may provide a sufficiently strong signal such that a distance measurement can be made from those RF antennas, thereby supplementing the deficiency caused by the current orientation of the device. Another implementation could use at least one smaller magnetic coil than is typically used in existing key fobs (e.g., a smaller diameter for a coil having windings not in the predominant plane of the display screen of the device).

Additionally, using both RF and LF can reduce the number of RF antennas relative to an embodiment where the device only uses RF antennas. The supplement of the LF antennas (which may be kept for legacy compliance) may reduce the costs of the RF system.

A. Hybrid System

Figure 6:
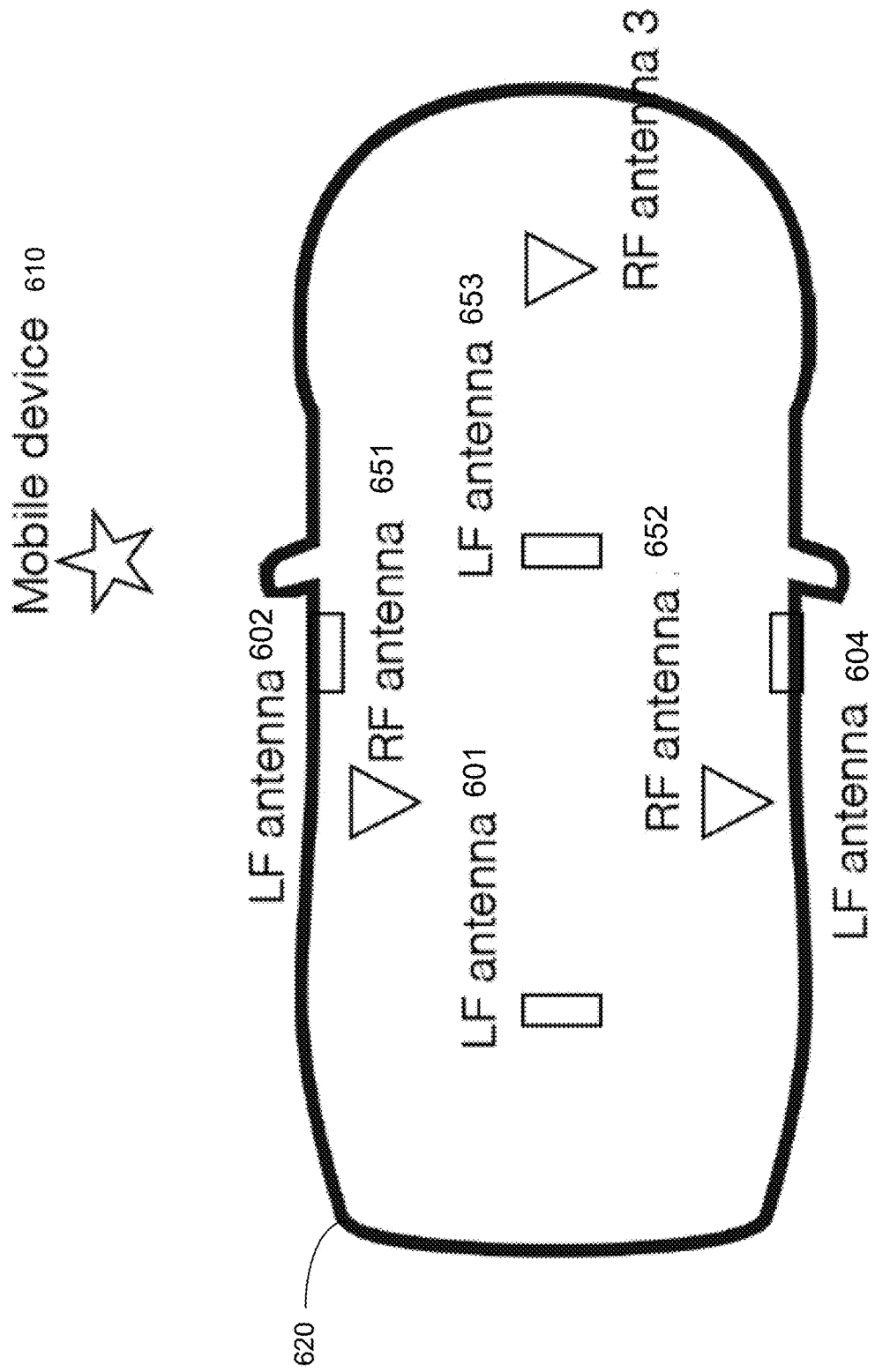
FIG. 6 shows a proposed high-level system design for a hybrid LF magnetic+RF ranging system for passive entry/passive start automotive system according to embodiments of the present invention.

FIG. 6 shows a proposed high-level system design for a hybrid LF magnetic and RF ranging system for passive entry/passive start automotive system according to embodiments of the present invention. The hybrid system can re-use existing LF antennas 601-604 in a vehicle 620, with the possibility of adding one or more LF antennas to provide orthogonal magnetic fields. As shown, the system includes the integration of RF antennas 651-653 (and potentially ranging chips) in various locations in vehicle 620. A mobile device 610 can integrate an RF ranging chip and an RF antenna, e.g., as described in FIG. 7.

Thus, in order to alleviate possible deficiencies that may occur with an RF-only ranging system, a hybrid LF+RF ranging system can be used. The hybrid system can provide all the performance benefits of the existing LF solution, but with distinct advantages for a mobile device. A hybrid solution can integrate an RF ranging chip and antenna(s) into the mobile device. An LF chip and antenna can be substantially smaller, e.g., if it is designed to work only when the user is relatively close to or inside the automotive (1-2 m from the center of the vehicle) as opposed to 10 meters away.

In some embodiments, mobile device 610 can re-use or integrate one or more magnetic coils in mobile device 610. Re-use of coils could be carried out by re-using coils for inductive charging or for near-field communications (NFC). Alternatively, if the mobile device does not support inductive charging (or NFC) or more coils are desired to provide field measurement orthogonality, additional coils can be added. As consumer mobile devices are space-constrained, this may limit the wire gauge, loop diameter, and number of turns in the coils.

Accordingly, a further benefit of a hybrid system can be gained by re-use of the components of an inductive (wireless) charging subsystem in the mobile device. These subsystems can include one or more inductive coils (e.g., an LF antenna), a chip to charge the battery from the received magnetic field, and typically operate in the 100s of kHz frequency range, which is similar to existing automotive LF systems. For example, the inductive charging coil can function in a similar manner as antenna 210 when a ranging operation is performed.

Re-use of existing wireless charging coils may cause a problem though. The number and orientation of LF antennas in the mobile device may be less than the desirable 3-D antenna configuration found in today's key fobs, such as key fob 200. This could be overcome in various ways. For example, additional coils can be added to the mobile device to provide full 3-D functionality, or the automobile's existing LF antennas can be augmented with additional antennas to generate magnetic fields in three orthogonal directions. Such implementations can ensure that the mobile device can measure a strong signal regardless of the orientation of the mobile device.

B. Hybrid Passive Entry System

Figure 7:
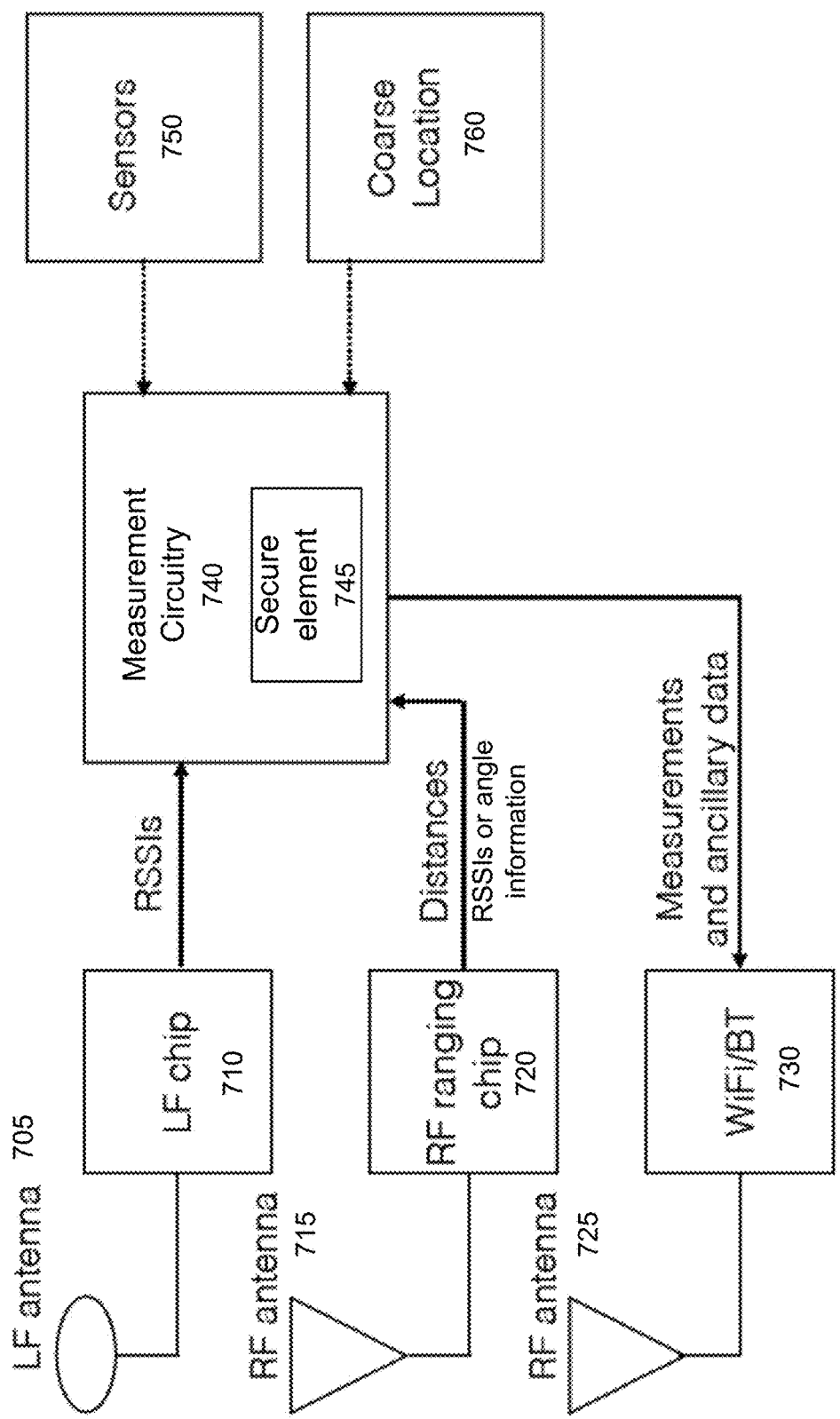
FIG. 7 shows a mobile device having components for data collection, processing, and transfer of measurements and ancillary data according to embodiments of the present invention.

FIG. 7 shows a mobile device having components for data collection, processing, and transfer of measurements and ancillary data according to embodiments of the present invention. Signals on LF antenna 705, which may correspond to multiple antennas, can be measured by LF chip 710 to provide signal values (e.g., RSSIs). Signals on RF antenna 715, which may correspond to multiple antennas, can be measured by RF chip 720 to provide signal values (e.g., time-of-flight, RSSIs, and/or angle information). A measurement circuitry 740 (e.g., in a programmable processor) can determined a distance or other distance information. Measurement circuitry 740 (or other circuitry) can include a secure element 745 for storing and managing keys, e.g., obtaining and providing encryption and authentication keys, as is described herein.

In one embodiment, the RSSI information for an RF signal can be used to weight the time-of-flight distance. Thus, the distance determined from a signal with a low strength can be given a lower weight. The angle information can be determined using a spacing between two vehicle antennas and using an attitude (orientation) measurement. The direction to each of the antennas can be determined, which can be used to constrain the location. For example, if the mobile device is in the field-of-view of a particular antenna based on distance measurements and signal strength (or phase), the location of the mobile device can be constrained.

In FIG. 7, LF RSSIs and RF distance information (e.g., time-of-flight information) from one or more vehicle RF and LF magnetic antennas can be measured on the mobile device. The measurements can then be filtered or processed to check on their integrity and remove outliers, e.g., by measurement circuitry 740, which may reside in an application processor of the mobile device. These measurements along with any required ancillary data, such as gyrometer, accelerometer, and coarse location data (e.g., GPS), can be collected and then transferred back to the automotive for precise mobile device location determination. As examples, sensors 750 can include gyrometer and/or accelerometer. As example, coarse location circuitry 760 can include GPS circuitry WiFi circuitry, or cellular circuitry. The transfer of the collected measurements and ancillary data can be over any suitable wireless communication system (e.g., circuitry 730 and RF antenna 725), including WiFi, BT, UWB, or even the LF system. Such ancillary data can provide one or more other values of one or more physical properties of the mobile device.

If only one magnetic coil is used, a diameter of a coil may be large, e.g., at least a ¼, ½, or nearly the longest length of the device, e.g., about 2-5 cm. The large diameter (and potentially more windings, e.g., 4-9) can increase sensitivity for measuring magnetic flux though the coils from the vehicles magnetic antennas. A gyrometer (e.g., one of sensors 750) may be used in conjunction with the measurement of the magnetic coil to calibrate the signal strength for a measured orientation. If only one device magnetic antenna is used, the signal strength would be dependent on the orientation of the device. If the vehicle antenna is identified (e.g., using an identifier that is unique among the antennas in the vehicle), then an orientation of the device (as measured by the gyrometer) can be correlated to a specific functional form for how distance varies against signal strength. For instance, one orientation (e.g., set of three angles: yaw, pitch, and roll) of the mobile device would provide one set of concentric circles of varying distance from the vehicle antenna, each circle corresponding to a different signal strength. Whereas, second orientation can have the same concentric circles but correspond to different signal strengths, as the different orientation would result in a different signal strengths at a same distance from the antenna.

Measurements can be made using different orientations so as to calibrate the distance for given measurement pair (data point) of signal strength and orientation. Not every possible combination of signal strength and orientation is needed, as interpolation or a functional fit to the measured calibration data point can be used to fill in the gaps not covered by the calibration data points. Accordingly, an orientation can be measure using a sensor of the mobile device, and the orientation used to determine a correspondence of distance between the device magnetic antenna and the vehicle magnetic antenna.

In some embodiments, the LF coils may predominately be used in close proximity to the vehicle (e.g., within 1 m or inside the vehicle), and thus the smaller magnetic coils (e.g., 0.5 cm or less) can measure a sufficiently strong signal from a vehicle LF antenna when within this range. When farther away from the vehicle, the RF ranging system can be used. The RF signals decay slower than the magnetic fields, and 10-cm accuracy is not needed when the device is further away from the vehicle.

A determination of whether to use the RF system or the LF system can be determined based on distance. For example, the RF system can begin to receive an appreciable signal before the LF system. In this manner, location circuitry (one mobile device or in the vehicle) can selectively ignore (or assign a low weight) to a negligible signal strength measured by the LF system, thereby determining the relative location using the RF system. Then, as the RF signals indicate a closer distance and/or the LF signals become appreciable, the LF signals can be assigned a higher weight and begin to be used. Then, at some point (e.g., based on RF and/or LF signals indicating a location within a threshold distance), the RF signal can be ignored or a weight assigned to the RF signals can begin decreasing as the device continues to approach the vehicle. For example, once the device is within the vehicle, the LF system can be used exclusively, at least in some embodiments.

In some embodiments, two coils can be used, where the two coils are orthogonal or at least 45° difference in the axes of the two coils. The diameter of one coil may be much larger than the other coil. The smaller coil may have more windings and/or thicker wire. Examples of inductance are between 60-80 μH.

C. Dual Use

As mentioned above, a coil in a consumer device (e.g., a mobile phone or watch) can be used for multiple purposes, one of which is for measuring magnetic signals emitted from a vehicle antenna. Such a coil may also be used for charging the device, for communicating data via NFC, or other purposes. Such re-use may be implemented with any of the embodiments that use a magnetic antenna.

According to an embodiment, a mobile device can comprise one or more magnetic antennas (e.g., 705 of FIG. 7) and strength measurement circuitry (e.g., 710 of FIG. 7) coupled with the one or more magnetic antennas and configured to provide a signal strength of a signal from an external antenna. The mobile device can also have a battery coupled with the one or more magnetic antennas and configured to be charged via magnetic fields interacting with the one or more magnetic antennas. The signal strength of the signal from the external antenna can be used in determining a location of the mobile device.

As another example, the mobile device can also have data communications circuitry (e.g., for NFC) coupled with the one or more magnetic antennas and configured to communicate data with an external device. The signal strength of the signal from the external antenna can be used in determining a location of the mobile device.

D. Method Using Hybrid System

Figure 8:
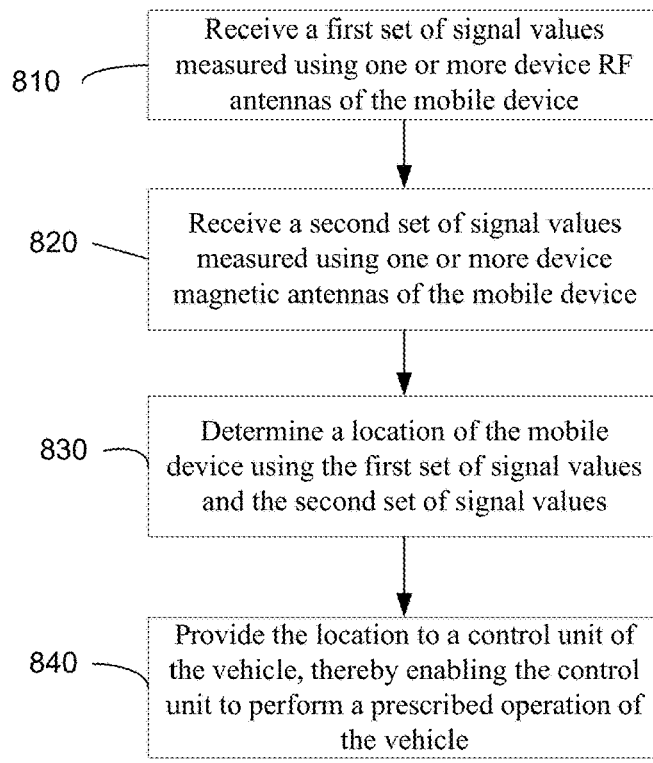
FIG. 8 is a flowchart of method of enabling an operation by a vehicle involving a mobile device according to embodiments of the present invention.

FIG. 8 is a flowchart of method 800 of enabling an operation by a vehicle involving a mobile device according to embodiments of the present invention. Method 800 may be performed by mobile device that measures signal values or by a vehicle that receives the signal values from the mobile device, e.g., a phone or a watch. Additionally, some embodiments can provide encryption or authentication, as well as mobile device/automobile discovery, e.g., as described herein.

At block 810, a first set of signal values measured using one or more device RF antennas of the mobile device is received. The first set of signal values can provide one or more first signal properties (e.g., signal strength or time-of-flight value, such as a round trip time (RTT)) of signals from one or more vehicle RF antennas of the vehicle. The one or more first signal properties of a signal can change with respect to a distance between a device RF antenna that received the signal and a vehicle RF antenna that emitted the signal.

The signals from a vehicle antenna can include an identifier that identifies a particular antenna. In this manner, the measured signal values can be associated with the correct antenna. The first set of signal values can be measured after an identification and/or authentication occurs between the mobile device and the vehicle. This RF measurement can occur at a relatively long distance from the vehicle, e.g., 15 m, 10 m, or 5 m from the vehicle. In various embodiments, the one or more RF antennas operate at a frequency in a range of 315 MHz to 956 MHz, 2402 MHz to 2480 MHz (for Bluetooth), and/or 3.1 GHz to 10.6 GHz (for UWB).

At block 820, a second set of signal values measured using one or more device magnetic antennas of the mobile device is received. The magnetic antennas can operate in a low frequency range (e.g., several hundreds of kHz, such as a range of 100 kHz to 900 kHz). The second set of signal values can provide one or more second signal properties of signals from one or more vehicle magnetic antennas of the vehicle. The one or more second signal properties (e.g., signal strength) of a signal can change with respect to a distance between a device magnetic antenna that received the signal and a vehicle magnetic antenna that emitted the signal. In some embodiments, the start of magnetic ranging can be triggered by RF measurements.

A set of signal values can include one signal value or multiple signal values. The set of signal values can include multiple signal values arising from one signal sent from a transmitting antenna and received by multiple antennas. In another example, the set of signal values can include multiple signal values arising from multiple signals sent from a transmitting antenna and received by one or more antennas.

At block 830, a location of the mobile device is determined using the first set of signal values and the second set of signal values. Each of the signal values can correspond to a particular distance from a corresponding vehicle antenna. Based on the distances, triangulation can be used to determine the location point that has the prescribed distances from each of the vehicle antennas. In some embodiments, the first set of signal values and the second set of signal values are both used to determine a same location at a same instance in time. In other embodiments, the first set of signal values can be used to measure a first location at a first time, and the second set of signal values can be used to measure a second location at a second time, thereby satisfying the determination of a location (i.e., one or more locations) using the first set of signal values and the second set of signal values.

In various embodiments, a Kalman filter, particle filter, Gaussian mixture filter or a least squares technique may be used to determine the location. The least squares technique can function to triangulate the signal to identify the location that best satisfies the measured distance to all of the antennas. Measurements for different antennas can be weighted differently in the least squares technique. Other error metrics can be used besides the squares, e.g., the absolute value of the difference between the measured distance and the distance of a selected coordinate and an antenna. Various techniques can be for solving the system of equations that minimizes a cost function of the error between a selected distance (and its associated distances) and the measured distance. For example, iterative optimization techniques can be used. The error in the measurements can be caused by noise in the signals, so that there is not a single location that exactly provides the measured distance to all antennas.

In some embodiments, the Kalman filter can use historical location information to better inform a current location. The Kalman filter can provide an optimal framework to provide a historical memory of the locations. The Kalman filter can be based on typical physical motion. Different models for the Kalman filter may be used for different physical motion, e.g., one Kalman filter for when the user is walking towards the vehicle and another Kalman filter a user is within the vehicle.

The determination of the location can be performed by the mobile device or the vehicle. For example, the mobile device can send distance information to the vehicle, which can determine the location. In some implementations, the distance information can corresponding to a transmission time(s) of a first set of pulses and a reception time(s) of a second set of pulses. The distance information can include timestamps corresponding to the first set of pulses in the ranging request message and the second set of pulses in the one or more ranging response messages, e.g., as shown in FIG. 5. The timestamps can be configurable to be used by a control unit of the vehicle to determine a distance of the mobile device from the vehicle, e.g., as described herein.

In other embodiments, the mobile device can determine the distance. For example, the mobile device can determine the distance using the transmission time(s) of the first set of pulses and the reception time(s) of the second set of pulses, as well as positions of the antennas in the vehicle. Thus, the distance information can include the distance.

At block 840, the location is provided (e.g., transmitted) to a control unit of the vehicle. The location can be provided internally (e.g., when determined by the vehicle) or transmitted from the mobile device (e.g., when the mobile device determines the location). In this manner, the control unit can be enabled to perform a prescribed operation of the vehicle. As an example, the location can be provided from one module of a vehicle control unit (e.g., unit 130 of FIG. 1) to another module, e.g., to open the doors or enable a start button. As another example, the location can be provided from the mobile device to the control unit, e.g., via an RF receiver (e.g., RF receiver 120 of FIG. 1).

The determination of whether a measured location is inside or outside the car can be made based on knowledge of the boundary of the vehicle. Whether the device is within the car can be used to determine whether the start button is enabled. In another example, a door or hatchback can be prevented from closing if the device is within the vehicle. The relationship between the boundary of the vehicle and vehicle antennas can be known by a control unit based on the design of the vehicle, e.g., programmed into the control unit.

Accordingly, a mobile device can include circuitry used in measuring signal values of RF signals and LF signals. According to one embodiment, a mobile device can comprise one or more RF antennas (e.g., 715 in FIG. 7) and an RF ranging circuit (e.g., 720 in FIG. 7) coupled with the one or more RF antennas. The RF ranging circuit can be configured to analyze signals from the one or more RF reception antennas and provide one or more first signal values related to a distance or an orientation of the mobile device relative to one or more RF source antennas. The mobile device can also include one or more magnetic antennas (e.g., LF antenna 705 in FIG. 7) and a magnetic measurement circuit (e.g., 710 in FIG. 6) coupled with the one or more magnetic antennas. The magnetic measurement circuit can be configured to analyze signals from the one or more magnetic antennas and provide one or more second signal values related to a distance of the mobile device relative to one or more magnetic source antennas.

The mobile device can also include measurement circuitry (e.g., 740 in FIG. 7) that is configured to provide the one or more first signal values and the one or more second signal values to a location circuitry for determining a location of the mobile device. The collection circuitry can be further configured to identify any outliers among the one or more first signal values and the one or more second signal values and exclude the outliers from providing to the location circuitry. The location circuitry may be located in a device external to the mobile device, such as a vehicle. In such an implementation, RF antenna 725 can be used to send the signal values.

E. Modified Vehicle

As mentioned above, the vehicle's existing LF antennas can be augmented with additional antennas to generate magnetic fields in three orthogonal directions. According to one embodiment, a vehicle comprises a plurality of sets of three orthogonal magnetic antennas. Each set of orthogonal magnetic antennas can emit a magnetic signal that is operable to be detected by a mobile device having a corresponding magnetic antenna for determining a location of the mobile device.

IV. Machine Learning

RF ranging technologies (e.g., ultra wideband (UWB)) can provide 10-cm ranging accuracy, have smaller antennas, and are more resilient to man-in-the-middle attacks. However, they may be susceptible to signal attenuation, delay, and multipath due to the automotive body, nearby objects, and the human body. These effects can cause inaccuracies in the position estimates, degrading the overall performance and practicality of an RF-based system. Additionally, the mobile device may have smaller or fewer coils (magnetic antennas), which can cause weaker, fewer, and/or less accurate measurements via an LF system. Embodiments can use a machine learning model to overcome such problems.

A. Region-Based Location Determination

Instead of computing the 2-D or 3-D coordinates of the key fob, it may be sufficient to group the locations into discrete locations of interest (e.g., inside the car and outside the car). A binary or multi-class decision can be made based on the key fob location. Posing the problem this way can relax the requirements of the positioning algorithm, and opens up opportunities to use a machine learning model to make decisions, which may include using statistical hypothesis testing.

Figure 9:
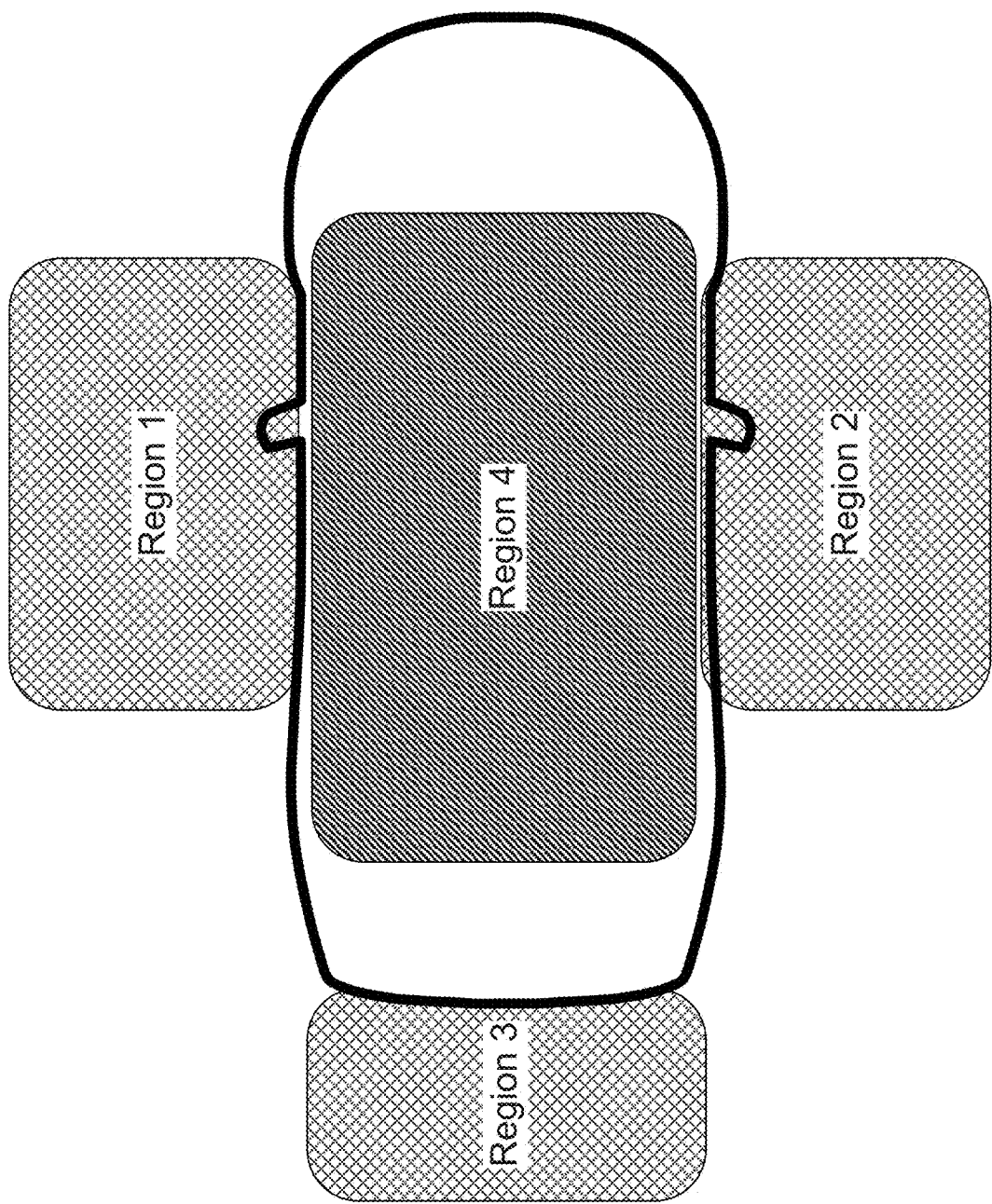
FIG. 9 shows a region-based passive entry/passive start automotive system according to embodiments of the present invention.

FIG. 9 shows a region-based passive entry/passive start automotive system according to embodiments of the present invention. FIG. 9 shows an example of grouping a subset of potential key fob locations into discrete regions of interest. For example, when the user is outside the locked automobile and touches the driver-side door, the positioning logic simply needs to make a reliable decision that the key fob is in region 1 in order to unlock the car. Alternatively, the decision to unlock could be made if the user is in any region outside the car, i.e., regions 1, 2, or 3. As long as the passive entry/passive start system receives the correct decision from the positioning algorithm, the system will work reliably.

Various embodiments may have more or less regions and shown in FIG. 9. For example, there may be only two regions: inside and outside of the vehicle. As examples with more regions, a fifth region could correspond to a location outside of the four vision shown. This fifth region would correspond to the mobile device being far away from the vehicle. Intent of the user with the mobile device to approach the vehicle may be inferred via a change from the fifth region to one of the closer outside regions, as can be done similarly when a specific distance is measured.

The four regions shown may be of different shapes than what is illustrated, e.g., region 2 may be longer such that it encompasses an entire side of the vehicle. Further, each of the regions may be broken into subregions. For instance, region 4 may have subregions corresponding to different parts of the interior of the vehicle, such as four or five different driver and passenger seats. A trunk or dashboard could also be a region. In one embodiment, when a machine learning model can be used to determine when a higher level region (e.g., whether inside or outside) and a separate model can be used to determine which subregion the device is within.

A machine learning (e.g., clustering, classification, or deep learning) approach to this problem is particularly valuable when the transceivers for the car and key fob ranging are RF-based as opposed to LF-based. RF signals are readily attenuated, delayed, reflected, and diffracted by the automotive body, nearby objects (other cars, the ground, building structures), and the human body. Note that LF signals typically do not suffer the same impairments, or the impairments are substantially smaller. The signal attenuation, delays, and multipath are stochastic effects that cause biases and noise in the range measurements. Physics-based techniques (e.g., Kalman or particle filters) that attempt to compensate for these effects are very challenging to implement reliably or have long convergence times.

B. Training

Figure 10:
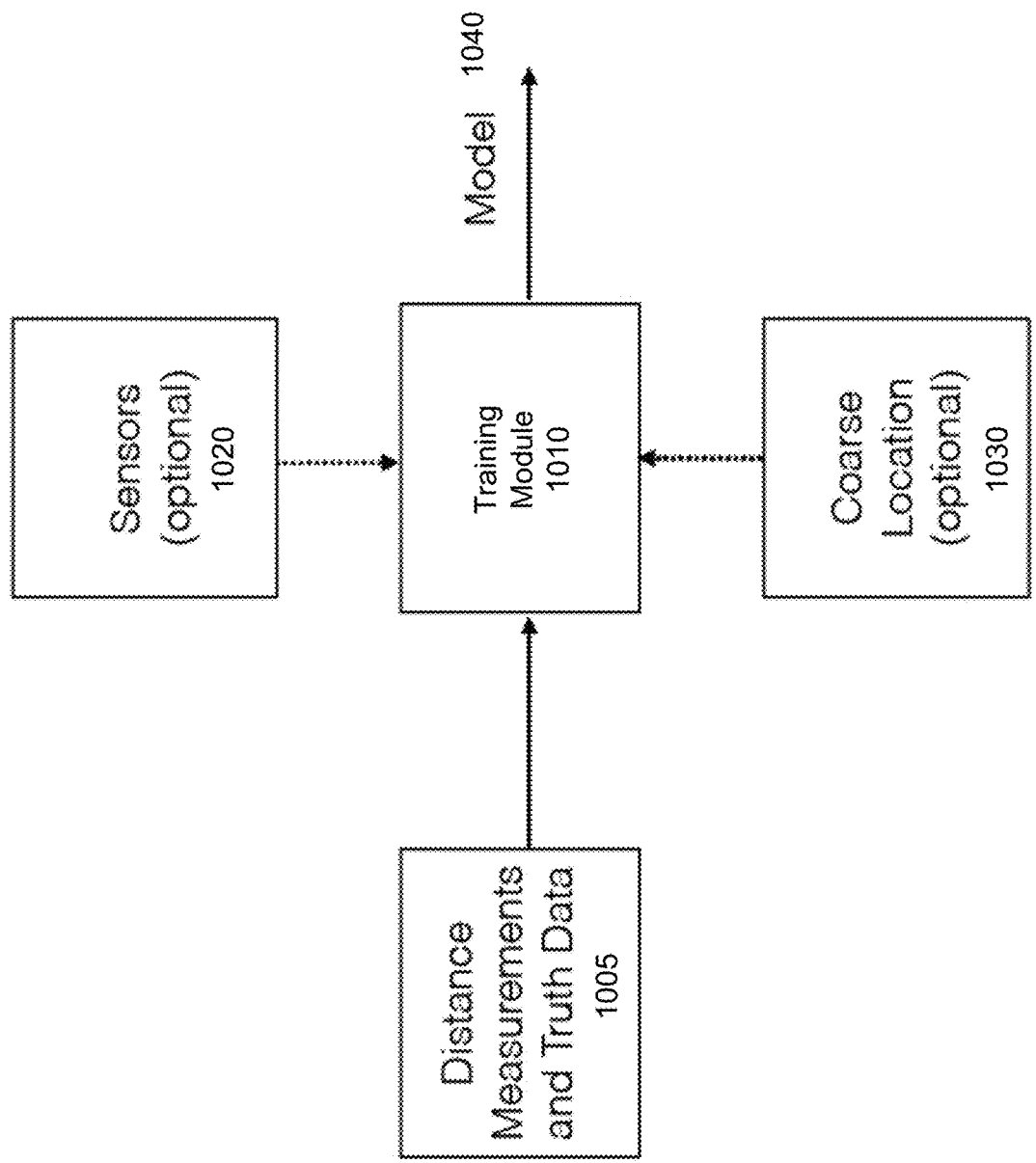
FIG. 10 shows a proposed machine learning training processing diagram according to embodiments of the present invention.

FIG. 10 shows a proposed machine learning training processing diagram according to embodiments of the present invention. A training module 1010 of a machine learning system can receive data 1005, which can include distance measurements and truth data. For example, input signal values that correspond to distance measurements from one or more transceivers on the vehicle can be received. As examples, the distance measurements can be RF, LF, or both. The truth data can correspond to a determination made by a person as the mobile device is moved within a region, potentially with the person in different configurations, such as walking or standing poses. In some embodiments, such measurements can be performed by an end user so as to calibrate for a specific care of the user. In other embodiments, the measurements can be made by a manufacturer of the mobile device, e.g., for one or more types of vehicles. Certain vehicles can share similar antenna configurations.

Additionally, ancillary data can be used to aid the machine learning. Examples of ancillary data include a coarse location 1030 (e.g., GPS location) and sensor data 1020 (e.g., accelerometer, gyrometer, etc.). This data can be used for training and providing a model 1130 in conjunction with the distance measurement data 1005. An example involving ancillary data is when the vehicle is in a home garage (e.g., single-car garage), which can correspond to a multipath environment with little or no metal objects around the vehicle. Such an environment would be substantially different than the multipath environment in a parking garage with other vehicles next to and in front of or behind the vehicle of interest. GPS can help identify which environment the vehicle is in, and the identified environment can be used as an input to the model or as a selection of which model to use. Models may be generated for each automotive type or for a group of automobiles In FIG. 10, the training of a model is shown. Distance measurements (e.g., RF or LF) can be made using a key fob, a consumer device, or a test platform from one or more automotive antennas. These measurements along with any required ancillary data (e.g., gyrometer, accelerometer, and/or coarse location data) can be used for machine learning training to produce one or more models. Additional potential machine learning features can include (1) the channel impulse response between each automotive transceiver and the key fob and (2) ratios of the received power of a first path to a second path, e.g., for multipath scenarios.

Measurements over many possible key fob locations inside and outside the car and in various places on or near the user's body may be required for sufficient performance. Models may be generated for each automobile, or a single model may be used for multiple automobiles. The number of training samples can be large, and can include various paths of a user walking towards the vehicle, with the mobile device held or carried in different configurations.

Examples of machine learning models include: decision trees (including gradient boosting and random forest), support vector machines, linear regression, logistic regression, and neural networks. A single machine learning model can be used to classify the device into one of three or more regions (e.g., 4 regions shown in FIG. 9). In another embodiment, a binary decision can be made for each region as to whether the devices in that region are not. A confidence score (probability) can be determined for each region having a positive decision (e.g., a distance to a hyperplane for support vector machines or a distance from a threshold value for logistic regression). A region with the highest confidence score can be selected as the proper region.

C. Machine Learning Passive Entry System

Figure 11:
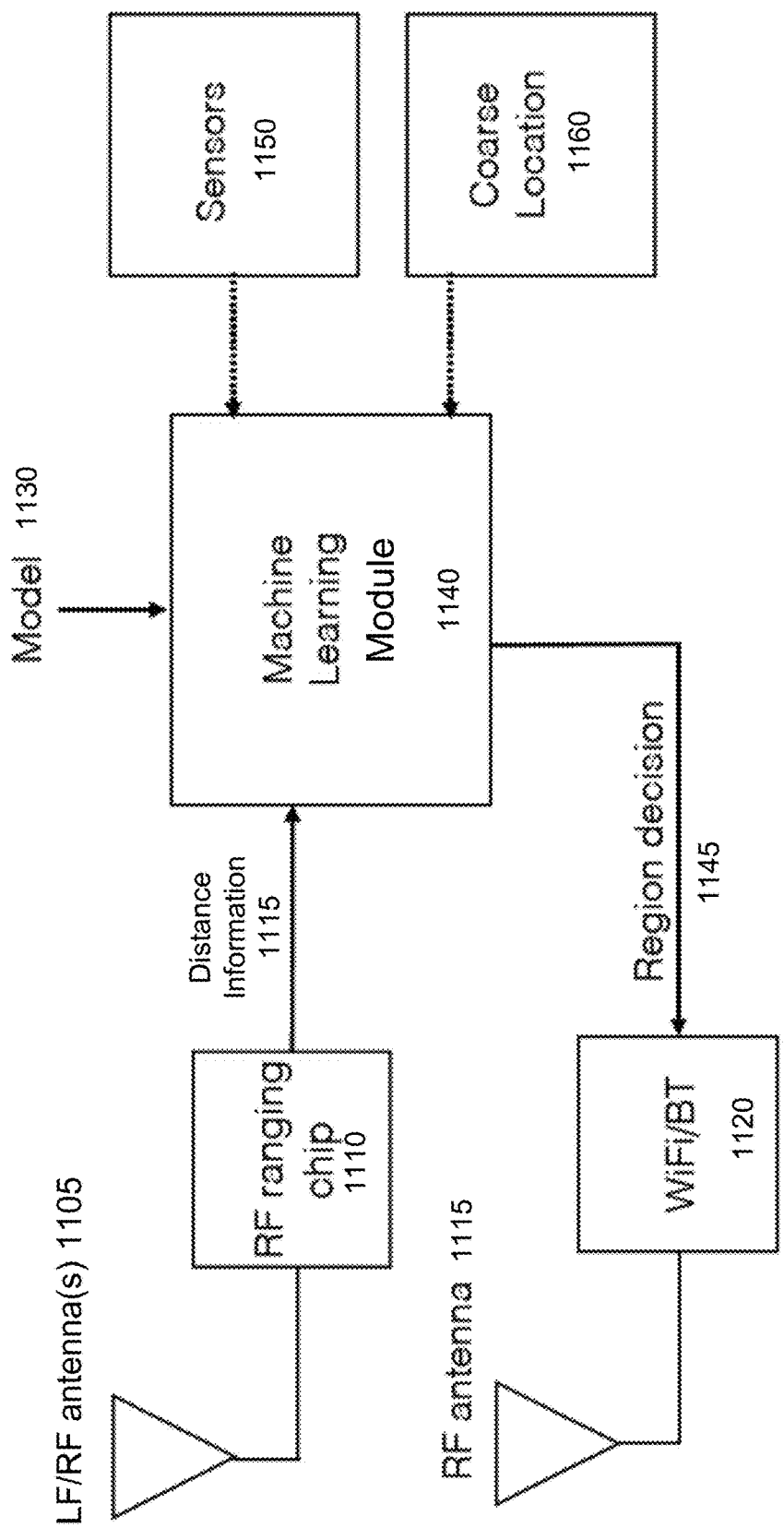
FIG. 11 shows an implementation of the machine-learning model for identifying which region a mobile device is located relative to a vehicle according to embodiments of the present invention.

FIG. 11 shows an implementation of the machine learning model for identifying which region a mobile device is located relative to a vehicle according to embodiments of the present invention. The decision can be based on measured distance information 1115 (e.g., RF and/or LF signal values) as obtained using antenna(s) 1105 and corresponding measurement circuitry 1110. Optional ancillary data can be obtained, e.g., by one or more sensors 1150 (e.g., an accelerometer or a gyrometer) and coarse location circuitry 1160 (e.g., GPS) of the mobile device. The machine learning model 1130 can be provided to a machine learning module 1140, which can be implemented by the mobile device or the vehicle. For example, measured distances (as represented by signal values) and optional ancillary data can be transferred to the vehicle from the mobile device in order for the decision to be made by the vehicle. In this case, the model could be transferred to or reside on the vehicle.

Distance information 1115 (such as time stamps, signal strengths, or an actual distance) can be measured on the mobile device using signals received from one or more vehicle antennas. These measurements along with any required ancillary data (such as gyrometer, accelerometer, and coarse location data) are used with the machine learning model 1130 to make a region decision 1145. Additional input features to model 1130 could be a channel impulse response and ratio of the received power for the first path to the second path.

The channel impulse response relates to multiple signals being received from a single antenna, with each signal corresponding to a different path of the signal. For example, a signal can travel directly between the antennas, but the signal can also reflect from various surfaces. The channel impulse response can be defined as a set of peaks in the measured signal over a given time interval. The ratio of the received power for a first path to a second path can measure the relative signal strength of the direct signal (first peak) in a signal with one reflection (second peak). The first peak can be used for determining the RTT. Another feature can include a ratio of the power of the first path relative to the total power of the channel impulse response.

In embodiments where machine learning module 1140 is on the mobile device, machine learning module 1040 can send the region decision 1145 to a network interface 1120 (e.g., WiFi or Bluetooth®.) for transmission via an RF antenna 1015. The transfer of the region decision 1145 back to the vehicle can be over any suitable wireless communication system, including WiFi, BT, or UWB. Such a machine learning approach could also work with conventional LF signals or as a hybrid system with LF and RF signals.

D. Method Using Region Decision

Figure 12:
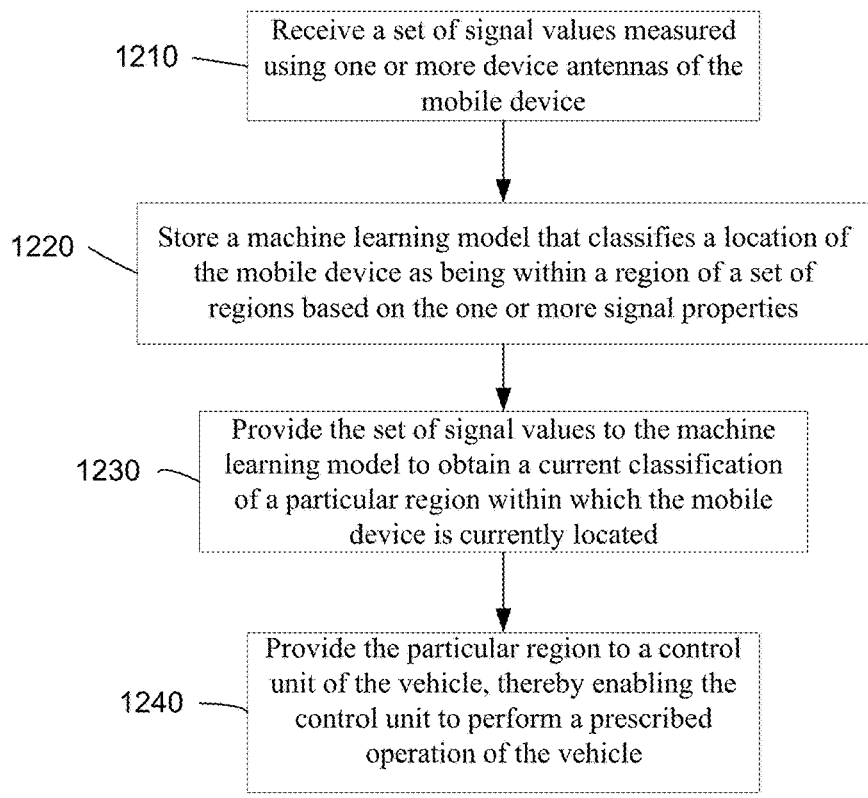
FIG. 12 is a flowchart of a method for enabling an operation by a vehicle involving a mobile device.

FIG. 12 is a flowchart of a method 1200 for enabling an operation by a vehicle involving a mobile device. Method 1200 can be performed by the mobile device or circuitry (e.g., a programmable processor and/or dedicated circuitry) of the vehicle.

At block 1210, a set of signal values measured using one or more device antennas of the mobile device is received. The set of signal values provide one or more signal properties of signals from a plurality of vehicle antennas having various locations in the vehicle. For example, the vehicle antennas can be LF and/or RF antennas, as shown in FIGS. 1, 3, 4, and 6. The one or more signal properties of a signal can change with respect to a distance between a device antenna of the mobile device that received the signal and a vehicle antenna that emitted the signal. In some embodiments, the set of signal values may be sent by the mobile device and received by the vehicle (e.g., RF receiver 120 of FIG. 1). In other embodiments, the set of signal values can be received by a module of the mobile device, e.g., machine learning module 1140 of FIG. 11.

At block 1220, a machine learning model that classifies a location of the mobile device as being within a region of a set of regions based on the one or more signal properties is stored. As examples, the model may be stored as software in memory coupled to a programmable processor, or be stored as dedicated circuitry. The set of regions can include a first subset of one or more regions outside the vehicle and a second subset of one or more regions outside the vehicle. FIG. 9 provides some example regions.

The machine learning model can be trained using various sets of signal values measured at locations across the plurality of regions. The training samples can be chosen to provide a representation of possible locations that the mobile device would be located, as well as configurations in orientation and placement on a user.

At block 1230, the set of signal values are provided to the machine learning model to obtain a current classification of a particular region within which the mobile device is currently located. In some implementations, a particular signal value can be NULL or some sentinel (special) value, such as a large negative number, e.g., when a measurement is not obtained for a particular vehicle antenna. In such a situation, another attempt may be made to obtain the signal values, or an error signal (e.g., an alert) can be provided to a user. In another implementation, a last measurement from the missing antenna may be used. Alternatively, the sentinel value can be provided to the machine learning model, which may still make a classification based on the proper signal values that were obtained.

The signal values may be obtained simultaneously, or at least within a same frame or time window. The signal values obtained within the time window (e.g., every second, 0.5 s, or 100 ms) can be used as a set of signal values. The exact time within a time window that a signal value is received can be used for providing to the machine learning model.

In some embodiments, the classification can be performed multiple times, each potentially with an associated probability, e.g., based on a distance of a metric of the machine learning model from a cutoff value that separates different classifications. An average of the probabilities can be used to determine the final classification. In other embodiments, a majority voting procedure can be used, thereby selecting the classification that appears the most out of N classification measurements.

At block 1240, the particular region is provided to a control unit of the vehicle, thereby enabling the control unit to perform a prescribed operation of the vehicle. Block 1240 may be performed in a similar manner as block 840 of FIG. 8. Results have shown at least 98% accuracy in identifying the mobile device being inside the vehicle, and at least 93% accuracy in accurately identify the mobile device in an outside region near the vehicle.

In some embodiments, a filter (e.g., a Kalman filter) can be used for the long-range determination of location (e.g., just using RF signals), and the machine learning model can be used for an accurate determination of which region the mobile device is within, e.g., when the mobile device is closer to the vehicle. As another example, the two techniques can be run simultaneously, and the reliability of each of the outputs can be used to dynamically select which one to use. For a Kalman filter, the signal values can be used individually when a respective measurement is obtained, and the filter can make a new determination upon each new signal value received.

Other information can be used as input features to the machine learning model, e.g., a seat sensor, a door open, etc. Alternatively, such other information can be used as a post-filter to confirm that no contradictory information exists, e.g., measurements that indicate the user is not within the car.

V. Determining Intent after Identification and Authentication

In some embodiments, the mobile device can always be listening in a low-power mode (e.g., using BTLE) for signal in a particular band. If there is some level of signal in that band, the mobile device can wake up and analyze the signal. In some implementations, the detected signal can include an encrypted message and/or a random value that the mobile device is to encrypt. The mobile device can store an encryption key (symmetric or asymmetric) that can decrypt the encrypted message so as to confirm an expected value of the message, thereby authenticating the vehicle. The same or a different key can be used to encrypt the random value, which can be sent to the vehicle in order for the vehicle to authenticate the mobile device. This messaging can occur over RF (e.g., over 400-700 MHz).

The vehicle may emit signals in response to one or more triggers, e.g., physically interacting with a door handle, start button, trunk button, or other part of the vehicle. In another implementation, the vehicle can emit signals for a certain amount of time after use.

Accordingly, in some embodiments, the mobile device can advertise a signal (e.g., a beacon signal, as may occur in BTLE) to which the vehicle can listen and wake up. Alternatively, the vehicle can advertise a signal, and the mobile device can listen continually.

Once communication has begun, ranging can be performed, as is described herein. Such ranging can be performed initially by RF, and in some embodiments, performed using magnetic antennas later. The switch to using magnetic techniques can depend on a location or change in location over time (e.g., showing an intent of a user). The intent of a user can also be used to enable a vehicle control unity to perform an operation. To determine intent of a user, a change in the motion can be tracked over time. For example, after ranging has begun (e.g., using an RF protocol), a change in distance can be tracked by performing time-of-flight measurements at multiple times.

As an example, if the motion (locations over time) of the mobile device is in a relatively straight line to the car (e.g., within an angle of 15°), then intent to use the car can be inferred. Such motion tracking may only require an accuracy of several feet (e.g., 1 m or less). The use of different RF antennas can be used to triangulate the position so that the trajectory of the motion can be determined, as opposed to just the change distance. Such intent can allow the car to react more quickly, than requiring the user to physically interact with the car first. In some implementations, the motion trajectory can be used to identify a particular part of the car that the device is approaching, e.g., the trunk, the driver's, or a particular passenger door.

Accordingly, some embodiments can determine the location of the mobile device at a plurality of times, thereby obtaining a plurality of locations of the mobile device outside the vehicle. The plurality of locations or a difference in the plurality of locations can be provided to the control unit of the vehicle, thereby enabling the control unit to perform a preparatory operation (e.g., turning on lights) of the vehicle based on a motion of the mobile device toward the vehicle.

VI. Example Device

Figure 13:
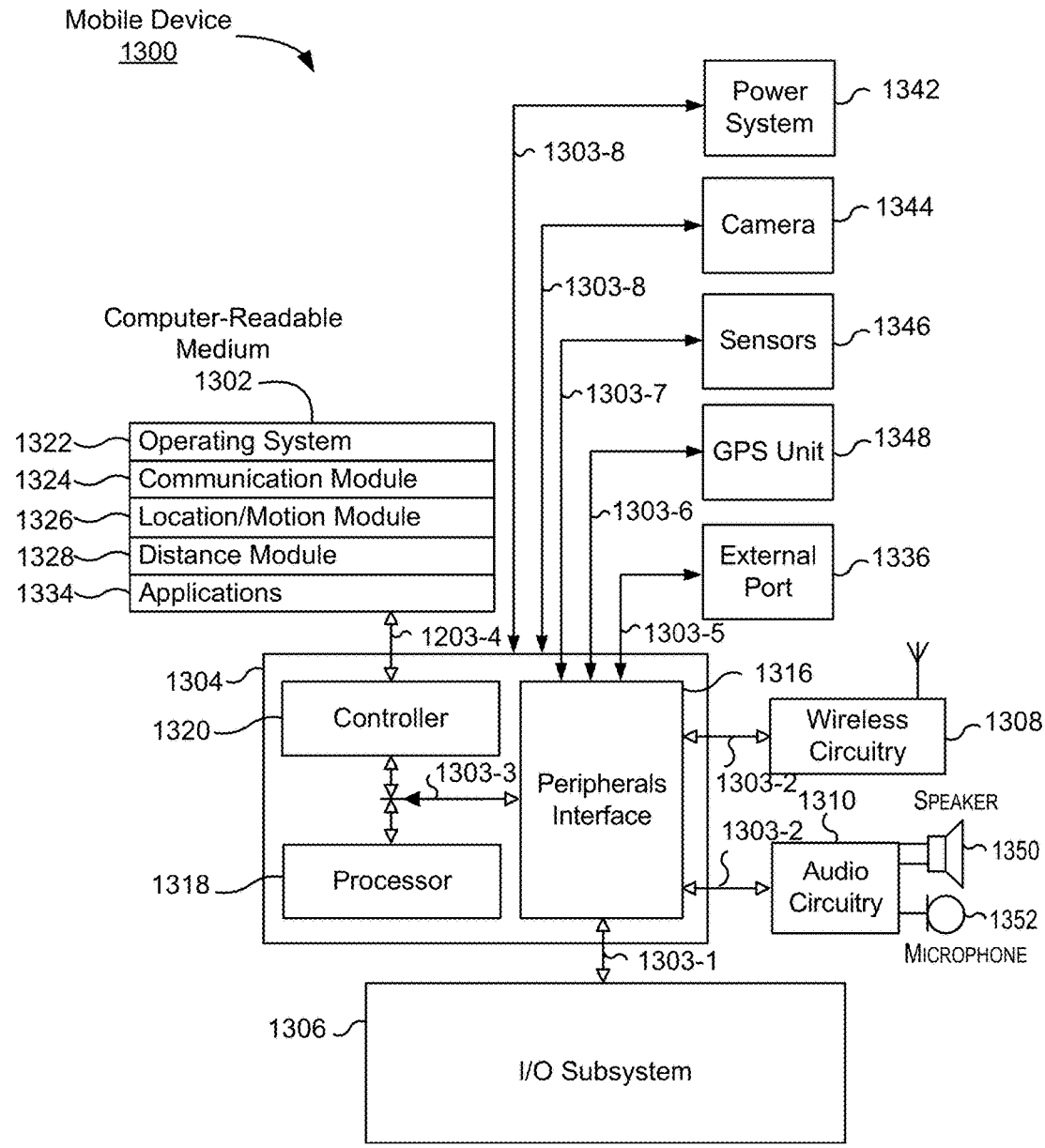
FIG. 13 is a block diagram of an example device, which may be a mobile device, in accordance with some embodiments.

FIG. 13 is a block diagram of an example device 1300, which may be a mobile device, in accordance with some embodiments. Device 1300 generally includes computer-readable medium 1302, a processing system 1304, an Input/Output (I/O) subsystem 1306, wireless circuitry 1308, and audio circuitry 1310 including speaker 1350 and microphone 1352. These components may be coupled by one or more communication buses or signal lines 1303. Device 1300 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 13 is only one example of an architecture for device 1300, and that device 1300 can have more or fewer components than shown, or a different configuration of components. The various components shown in FIG. 13 can be implemented in hardware, software, or a combination of both hardware and software, including one or more signal processing and/or application specific integrated circuits.

Wireless circuitry 1308 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1308 can use various protocols, e.g., as described herein. For example, wireless circuitry 1308 can have one component for one wireless protocol (e.g., Bluetooth®) and a separate component for another wireless protocol (e.g., UWB). Different antennas can be used for the different protocols.

Wireless circuitry 1308 is coupled to processing system 1304 via peripherals interface 1316. Interface 1316 can include conventional components for establishing and maintaining communication between peripherals and processing system 1304. Voice and data information received by wireless circuitry 1308 (e.g., in speech recognition or voice command applications) is sent to one or more processors 1318 via peripherals interface 1316. One or more processors 1318 are configurable to process various data formats for one or more application programs 1334 stored on medium 1302.

Peripherals interface 1316 couple the input and output peripherals of the device to processor 1318 and computer-readable medium 1302. One or more processors 1318 communicate with computer-readable medium 1302 via a controller 1320. Computer-readable medium 1302 can be any device or medium that can store code and/or data for use by one or more processors 1318. Medium 1302 can include a memory hierarchy, including cache, main memory and secondary memory.

Device 1300 also includes a power system 1342 for powering the various hardware components. Power system 1342 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1300 includes a camera 1344. In some embodiments, device 1300 includes sensors 1346. Sensors can include one or more accelerometers, compasses, gyrometer, pressure sensors, audio sensors, light sensors, barometers, and the like. Sensors 1346 can be used to sense location aspects, such as auditory or light signatures of a location.

In some embodiments, device 1300 can include a GPS receiver, Global Navigation Satellite System (GLONASS), BeiDou, Galileo and other combinations of devices, sometimes referred to as a GPS unit 1348. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1318 run various software components stored in medium 1302 to perform various functions for device 1300. In some embodiments, the software components include an operating system 1322, a communication module (or set of instructions) 1324, a location module (or set of instructions) 1326, a distance module 1328 (e.g., including software for analyzing or controlling an RF ranging chip or an LF chip, possibly including a machine learning model), and other applications (or set of instructions) 1334. Distance module 1328 can send/receive ranging messages to/from an antenna, e.g., connected to wireless circuitry 1308. The messages can be used for various purposes, e.g., to identify a sending antenna of a vehicle, determine timestamps of messages (e.g., for sending to the vehicle), and potentially to determine a distance of mobile device 1300 from the vehicle. As an example, distance module 1328 may include machine learning module 1140.

Operating system 1322 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1324 facilitates communication with other devices over one or more external ports 1336 or via wireless circuitry 1308 and includes various software components for handling data received from wireless circuitry 1308 and/or external port 1336. External port 1336 (e.g., USB, FireWire, Lightning connector, 60-pin connector, etc.) is adapted for coupling directly to other devices or indirectly over a network (e.g., the Internet, wireless LAN, etc.).

Location/motion module 1326 can assist in determining the current position (e.g., coordinates or other geographic location identifier) and motion of device 1300. Location/motion module can include a machine learning module, as well as relate to more standard location functionality. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1326 receives data from GPS unit 1348 and analyzes the signals to determine the current position of the mobile device. In some embodiments, location/motion module 1326 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1308 and is passed to location/motion module 1326. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1300 based on the position coordinates of the corresponding transmitters. Regardless of the specific location technology used, location/motion module 1326 can receive information from which a location fix can be derived, interprets that information, and returns location information, such as geographic coordinates, latitude/longitude, or other location fix data.

The one or more applications 1334 on the mobile device can include any applications installed on the device 1300, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1306 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1306 can include a display and user input devices such as a keyboard, mouse, and/or track pad. In some embodiments, I/O subsystem 1306 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1302) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1300 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the embodiments may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

What is claimed is:

1. A method of enabling an operation by a vehicle involving a mobile device, the method comprising:
   receiving a first set of signal values measured using one or more device radiofrequency (RF) antennas of the mobile device, the first set of signal values providing one or more first signal properties of signals in a first frequency range emitted from one or more vehicle RF antennas of the vehicle, wherein the one or more first signal properties of a signal change with respect to a distance between a device RF antenna that received the signal and a vehicle RF antenna that emitted the signal;
   receiving a second set of signal values measured using one or more device magnetic antennas of the mobile device, the second set of signal values providing one or more second signal properties of signals in a second frequency range lower than the first frequency range emitted from one or more vehicle magnetic antennas of the vehicle, wherein the one or more second signal properties of a signal change with respect to a distance between a device magnetic antenna that received the signal and a vehicle magnetic antenna that emitted the signal;
   determining a location of the mobile device relative to the vehicle using the one or more first signal properties of the first set of signal values and the one or more second signal properties of the second set of signal values that change with respect to a relative distance between the mobile device and the vehicle; and
   providing the location of the mobile device relative to the vehicle to a control unit of the vehicle, thereby enabling the control unit to perform a prescribed operation of the vehicle based on the location of the mobile device relative to the vehicle.

2. The method of claim 1, further comprising:
   receiving an orientation measured using a sensor of the mobile device; and
   using the orientation to determine a correspondence of distance between a respective device magnetic antenna and a respective vehicle magnetic antenna.

3. The method of claim 1, wherein the location of the mobile device is determined using the first set of signal values measured using the one or more device RF antennas at a first time when the mobile device is outside of the vehicle, and wherein the location of the mobile device is determined using the second set of signal values measured using the one or more device magnetic antennas at a second time when the mobile device is inside of the vehicle.

4. The method of claim 1, wherein determining the location of the mobile device relative to the vehicle includes:
   storing a model that determines the location of the mobile device relative to the vehicle based on the one or more first signal properties and the one or more second signal properties; and
   providing the first set of signal values and the second set of signal values to the model to obtain the location of the mobile device relative to the vehicle.

5. The method of claim 4, wherein the model is a machine learning model that classifies a location of the mobile device relative to the vehicle as being within a region of a set of pre-defined regions based on the one or more first signal properties and the one or more second signal properties, the set of pre-defined regions including a first subset of one or more regions outside the vehicle and a second subset of one or more regions outside the vehicle, the machine learning model being trained using various sets of signal values measured at locations across the set of pre-defined regions; and wherein the location of the mobile device relative to the vehicle corresponds to a current classification of a particular region within which the mobile device is currently located.

6. A method for enabling an operation by a vehicle involving a mobile device, the method comprising:

receiving a set of signal values measured using one or more device antennas of the mobile device, the set of signal values providing one or more signal properties of signals from a plurality of vehicle antennas having various locations in the vehicle, wherein the one or more signal properties of a signal change with respect to a distance between a device antenna of the mobile device that received the signal and a vehicle antenna that emitted the signal;

storing a machine learning model that classifies a location of the mobile device as being within a region of a set of pre-defined regions in a vicinity of the vehicle based on the one or more signal properties of the signals from the plurality of vehicle antennas, the set of pre-defined regions including a first subset of one or more regions outside the vehicle and a second subset of one or more regions outside the vehicle, the machine learning model being trained using various sets of signal values measured at various locations across the set of pre-defined regions;

providing the set of signal values to the machine learning model to obtain a current classification of a particular region of the set of pre-defined regions within which the mobile device is currently located; and providing the particular region to a control unit of the vehicle, thereby enabling the control unit to perform a prescribed operation of the vehicle.

7. The method of claim 6, further comprising:

receiving one or more other values measured by the mobile device, the one or more other values providing one or more physical properties of the mobile device, wherein the machine learning model is trained using the one or more physical properties; and providing the one or more other values to the machine learning model to obtain the current classification of the particular region within which the mobile device is currently located.

8. The method of claim 6, wherein the method is performed by the mobile device, the method further comprising:

measuring the signal values using the mobile device.

9. The method of claim 6, wherein the method is performed by a computer of the vehicle.

10. The method of claim 6, wherein the one or more signal properties include a signal strength, a time-of-flight value, or both.

11. The method of claim 6, further comprising:

determining the location of the mobile device relative to the vehicle at a plurality of times, thereby obtaining a plurality of locations of the mobile device outside the vehicle; and providing the plurality of locations or a difference in the plurality of locations to the control unit of the vehicle, thereby enabling the control unit to perform a preparatory operation of the vehicle based on a motion of the mobile device toward the vehicle.

12. The method of claim 6, wherein the one or more device antennas of the mobile device include one or more radiofrequency (RF) antennas, include one or more magnetic antennas, or include one or more RF antennas and one or more magnetic antennas.

13. The method of claim 12, wherein the one or more device antennas of the mobile device include one or more RF antennas and one or more magnetic antennas, wherein the one or more RF antennas operate within a range of 3.1 GHz to 10.6 GHz, and wherein the one or more magnetic antennas operate within a range of 100 kHz to 900 kHz.

14. The method of claim 1, wherein determining the location of the mobile device relative to the vehicle comprises:

determining a respective first distance between a respective device RF antenna and a respective vehicle RF antenna using the one or more first signal properties of the first set of signal values;

determining a respective second distance between a respective magnetic antenna and a respective vehicle magnetic antenna using the one or more second signal properties of the second set of signal values; and determining the location of the mobile device relative to the vehicle based on the first distances and the second distances.

15. A mobile device comprising:

one or more radiofrequency (RF) reception antennas;

an RF ranging circuit coupled with the one or more RF reception antennas, the RF ranging circuit configured to:

analyze signals in a first frequency range from the one or more RF reception antennas; and provide one or more first signal values related to a distance or an orientation of the mobile device relative to one or more RF source antennas in a vehicle;

one or more magnetic antennas; and a magnetic measurement circuit coupled with the one or more magnetic antennas, the magnetic measurement circuit configured to:

analyze signals in a second frequency range lower than the first frequency range from the one or more magnetic antennas; and provide one or more second signal values related to a distance of the mobile device relative to one or more magnetic source antennas in the vehicle.

16. The mobile device of claim 15, further comprising:

collection circuitry configured to provide the one or more first signal values and the one or more second signal values to a location circuitry for determining a location of the mobile device relative to the vehicle.

17. The mobile device of claim 16, wherein the location circuitry is located in a device external to the mobile device.

18. The mobile device of claim 17, wherein the external device is in the vehicle.

19. The mobile device of claim 18, wherein the location circuitry is configured to:

store a machine learning model that classifies a location of the mobile device relative to the vehicle as being within a region of a set of pre-defined regions based on the one or more first signal values, the one or more second signal values, or both, wherein the set of pre-defined regions including a first subset of one or more regions outside the vehicle and a second subset of one or more regions outside the vehicle, the machine learning model being trained using various sets of signal values measured at locations across the set of pre-defined regions; and provide the set of signal values to the machine learning model to obtain a current classification of a particular region within which the mobile device is currently located.

20. The mobile device of claim 19, further comprising:
data communication circuitry configured to provide the particular region to a control unit of the vehicle, thereby enabling the control unit to perform a prescribed operation of the vehicle.

21. The mobile device of claim 16, wherein the collection circuitry is further configured to:
identify any outliers among the one or more first signal values and the one or more second signal values; and
exclude the outliers from providing to the location circuitry.

* * * * *